(12) United States Patent
Kang et al.

(10) Patent No.: US 11,078,929 B2
(45) Date of Patent: Aug. 3, 2021

(54) HYDRAULIC STRIKING DEVICE

(71) Applicant: SOOSAN HEAVY INDUSTRIES CO., LTD., Hwaseong (KR)

(72) Inventors: Young Ky Kang, Pyeongtaek (KR); Jae Sang Cho, Suwon (KR); Tae Yong Kim, Busan (KR)

(73) Assignee: SOOSAN HEAVY INDUSTRIES CO., LTD., Hwaseong (KR)

( * ) Notice: Subject to any disclaimer, the term of this patent is extended or adjusted under 35 U.S.C. 154(b) by 0 days.

(21) Appl. No.: 16/628,639

(22) PCT Filed: Jul. 25, 2017

(86) PCT No.: PCT/KR2017/007976
§ 371 (c)(1),
(2) Date: Jan. 3, 2020

(87) PCT Pub. No.: WO2019/022265
PCT Pub. Date: Jan. 31, 2019

(65) Prior Publication Data
US 2020/0166058 A1    May 28, 2020

(30) Foreign Application Priority Data
Jul. 24, 2017 (KR) .......................... 10-2017-0093279

(51) Int. Cl.
*F15B 13/04*     (2006.01)
*E02F 9/22*      (2006.01)
*G05D 7/01*      (2006.01)

(52) U.S. Cl.
CPC ........ *F15B 13/0402* (2013.01); *E02F 9/2225* (2013.01); *E02F 9/2267* (2013.01); *E02F 9/2275* (2013.01); *G05D 7/014* (2013.01)

(58) Field of Classification Search
CPC ....... E02F 9/2275; E02F 9/2267; E02F 3/966; E02F 9/2225; B25D 9/145; B25D 9/16; F15B 13/0402
See application file for complete search history.

(56) References Cited

U.S. PATENT DOCUMENTS 4,817,737 A * 4/1989 Hamada ................. B25D 9/145
173/115
4,930,584 A * 6/1990 Chaur Ching ......... B25D 9/145
173/133

(Continued)

FOREIGN PATENT DOCUMENTS

JP     2008506543 A    3/2008
KR    20050005133 A    1/2005

(Continued)

OTHER PUBLICATIONS

Search Report dated Apr. 19, 2018 for PCT Application No. PCT/KR2017/007976.

*Primary Examiner* — Abiy Teka

(57) ABSTRACT

A hydraulic striking device that is mounted on construction equipment such as an excavator and breaks solid rocks in the grounds using a rod that is hit by a piston is proposed. Particularly, a hydraulic striking device that can automatically switch stroke modes by sensing the intensity of pressure of an upper chamber formed at an upper portion between a piston and a cylinder in accordance with the statuses of rocks in the ground is proposed.

6 Claims, 14 Drawing Sheets

(56) References Cited

U.S. PATENT DOCUMENTS

| | | | | |
|---|---|---|---|---|
| 5,134,989 A * | 8/1992 | Akahane | ................ | B25D 9/145 |
| | | | | 125/23.01 |
| 10,052,746 B2 * | 8/2018 | Autschbach | ........... | B25D 9/145 |

FOREIGN PATENT DOCUMENTS

| | | | |
|---|---|---|---|
| KR | 20110060387 A | 6/2011 | |
| KR | 101072069 B1 | 10/2011 | |
| KR | 20160015487 A | 2/2016 | |
| KR | 101709673 B1 | 3/2017 | |
| WO | WO-2017222210 A1 * | 12/2017 | ............... B25D 9/04 |

* cited by examiner

HYDRAULIC STRIKING DEVICE

CROSS REFERENCE TO RELATED APPLICATION

The present application claims priority to Korean Patent Application No. 10-2017-0093279, filed Jul. 24, 2017, the entire contents of which is incorporated herein for all purposes by this reference.

TECHNICAL FIELD

The present invention relates to a hydraulic striking device and, more particularly, to a hydraulic striking device that is mounted on construction equipment such as an excavator and breaks solid rocks etc. in the ground using a rod that is hit by a piston.

BACKGROUND ART

A hydraulic striking device, which is equipment that is mounted on construction equipment such as an excavator or a loader to break solid rocks or concrete, strikes a rod, which is a breaking tool, with a piston by operating a cylinder and breaks objects such as rocks and concrete by applying shock to the objects with the rod.

A hydraulic striking device can adjust the striking force that is applied to a rod, depending on the position of a top dead center of a piston, and the striking force can be largely classified into two types. That is, the striking types of hydraulic striking devices can be classified into a long-stroke that has a relatively high top dead center and strongly strikes a rod and a short-stroke that has a relatively low top dead center and weakly strikes a rod. The long-stroke is useful for breaking ground made of hard rocks and the short-stroke is useful for breaking ground made of weak rocks.

Accordingly, a hydraulic striking device that can change the striking types, that is, the long-stroke and the short-stroke in accordance with the status of rocks in the ground has been developed and such a hydraulic striking device has been disclosed in Korean Patent No. 10-1072069 (hereafter, referred to as Patent Document 1).

According to the breaker disclosed in Patent Document 1, a switch knob for adjusting a striking force and preventing idling of the breaker is disposed on a side of a cylinder, and when any one of a strong stroke, a weak stroke, and anti-idling is selected by turning the switch knob, a rod can be selectively struck by a piston in an anti-idling mode, a strong stroke mode, or a weak stroke mode through a stroke control valve connected with the switch knob.

However, according to the breaker disclosed in Patent Document 1, only when the switching knob is turned, the stroke control valve blocks an anti-idling line or a strong stroke line and a strong stroke or weak stroke can be performed. Accordingly, a user has to check the status of rocks and turn the switch knob in person to switch into a strong stroke or weak stroke when breaking rocks in the ground with the breaker, so work efficiency is deteriorated and it is inconvenient to use the breaker.

DOCUMENTS OF RELATED ART (Patent Document 1) Korean Patent No. 10-1072069 (Nov. 4, 2011)

DISCLOSURE

Technical Problem

The present invention has been made in an effort to solve the problems and an object of the present invention is to provide a hydraulic striking device that can automatically change stroke modes by sensing pressure in an upper chamber at the upper portion between a piston and a cylinder, depending on the status of rocks in the ground.

Technical Solution

A hydraulic striking device according to an aspect of the present invention that has a piston disposed in a cylinder to move up and down, an upper chamber formed at an upper portion between the piston and the cylinder, and a lower chamber formed at a lower portion between the piston and the cylinder, includes: a piston control valve controlling the piston moving up and down; a stroke force control valve controlling the piston control valve; a rock strength sensing valve controlling the stroke force control valve; a fourth supply line connecting the rock strength sensing valve and the piston control valve to each other; and a third actuating line connecting the stroke force control valve and the piston control valve to each other. The piston control valve has: a body; a piston control valve chamber formed in the body; a slider moving up and down between the body and the piston control valve chamber; and a first groove formed at the slider. When the slider is positioned at a down-position, the fourth supply line and the third actuating line are connected through the first groove, and when the slider is positioned at an up-position, the fourth supply line and the third actuating line are disconnected. When the rock strength sensing valve is operated and the fourth supply line and the third actuating line are connected to each other, working fluid is supplied through the fourth supply line and the third actuating line and operates the stroke force control valve.

The hydraulic striking device may further include: an intermediate chamber formed between the upper chamber and the lower chamber between the piston and the cylinder; a third supply line connecting an inlet port through which working fluid flows inside and the stroke force control valve to each other; a first short-stroke line connecting the intermediate chamber and the stroke force control valve to each other; a second short-stroke line connecting the first short-stroke line and the piston control valve to each other; a first long-stroke line connecting the intermediate chamber and the stroke force control valve to each other and jointed to the intermediate chamber higher than the first short-stroke line; and a second long-stroke line connecting the first long-stroke line and the piston control valve. The stroke force control valve may have a first spool operating the stroke force control valve, and when the first spool is pressed and moved up, the first spool may disconnect the first short-stroke line and the second short-stroke line from each other and may connect the third supply line and the third actuating line to each other.

The hydraulic striking device may further include: an intermediate chamber formed between the upper chamber and the lower chamber between the piston and the cylinder; a third supply line connecting an inlet port through which working fluid flows inside and the stroke force control valve to each other; a first short-stroke line connecting the intermediate chamber and the stroke force control valve to each other; a second short-stroke line connecting the first short-stroke line and the piston control valve to each other; a first long-stroke line connecting the intermediate chamber and the stroke force control valve to each other and jointed to the intermediate chamber higher than the first short-stroke line; and a second long-stroke line connecting the first long-stroke line and the piston control valve. The stroke force control valve may have a first spool operating the stroke force control valve. The first spool may have: a first spool lower pressing surface forming a bottom of the first spool; a first spool lower blocking portion formed over the first spool lower pressing surface; a first spool upper blocking portion formed over the first spool lower blocking portion; a first spool upper pressing surface forming a top of the first spool; a first spool lower bridge formed between the first spool lower pressing surface and the first spool lower blocking portion; and a first spool upper bridge formed between the first spool lower blocking portion and the first spool upper blocking portion. When the first spool is installed in the stroke force control valve such that the first spool lower pressing surface faces the third actuating line, the first spool may be installed in a first installation posture. When the first spool is installed in the first installation posture and positioned at a down-position, the first short-stroke line and the second short-stroke line may be connected through the first spool upper bridge, and the first long-stroke line and the second long-stroke line may be disconnected by the first spool upper blocking portion. When the first spool is installed in the first installation posture, the first spool lower pressing surface is pressed by working fluid supplied through the third supply line, and the first spool is positioned in an up-position; the first short-stroke line and the second short-stroke line may be disconnected from each other by the first spool lower blocking portion, and the first long-stroke line and the second long-stroke line may be connected to each other through the first spool upper bridge.

When the first spool is installed in the first installation posture and positioned at the down-position, the third supply line and the third actuating line may be disconnected from each other by the first spool lower pressing surface. When the first spool is installed in the first installation posture, the first spool lower pressing surface is pressed by working fluid supplied through the third supply line, and the first spool is positioned at the up-position; the third supply line and the third actuating line may be connected to each other.

When the first spool is installed in the stroke force control valve such that the first spool upper pressing surface faces the third actuating line, the first spool may be positioned in a second installation posture. When the first spool is installed in the second installation posture and positioned at the down-position, the first short-stroke line and the second short-stroke line may be disconnected from each other by the first spool upper blocking portion, and the first long-stroke line and the second long-stroke line may be connected to each other by the first spool upper bridge. When the first spool is installed in the second installation posture, the first spool upper pressing surface is pressed by working fluid supplied through the third supply line, and the first spool is positioned at the up-position; the first short-stroke line and the second short-stroke line may be disconnected from each other by the first spool upper blocking portion, and the first long-stroke line and the second long-stroke line may be connected to each other by the first spool upper bridge.

The first spool lower pressing surface may have a larger cross-sectional area than the first spool upper pressing surface.

Advantageous Effects

The hydraulic striking device of the present invention has the following effects.

It is possible to automatically switch a stroke mode into a short-stroke mode or a long-stroke mode in accordance with the statuses of rocks in the ground, so it is possible to efficiently break the ground.

Since a first groove connects or disconnects a fourth supply line 714 and a third actuating line, depending on the position of a slider, it is possible to easily change into a long-stroke mode from a short-stroke mode.

When the first spool is moved up to the up-position, the third supply line and the third actuating line are connected, so the slider can be easily moved up to an intermediate position and the first spool can be maintained at the up-position for a sufficient time. Accordingly, it is possible to more easily change into the long-stroke mode.

By selectively installing the first spool of the stroke force control valve in the first installation posture or the second installation posture, it is possible to change into the short-stroke mode or the long-stroke mode or maintain the long-stroke mode, so it is possible to break the ground in a desired stroke mode, depending on the statuses of rocks in the ground.

MODE FOR INVENTION

Figure 1A:
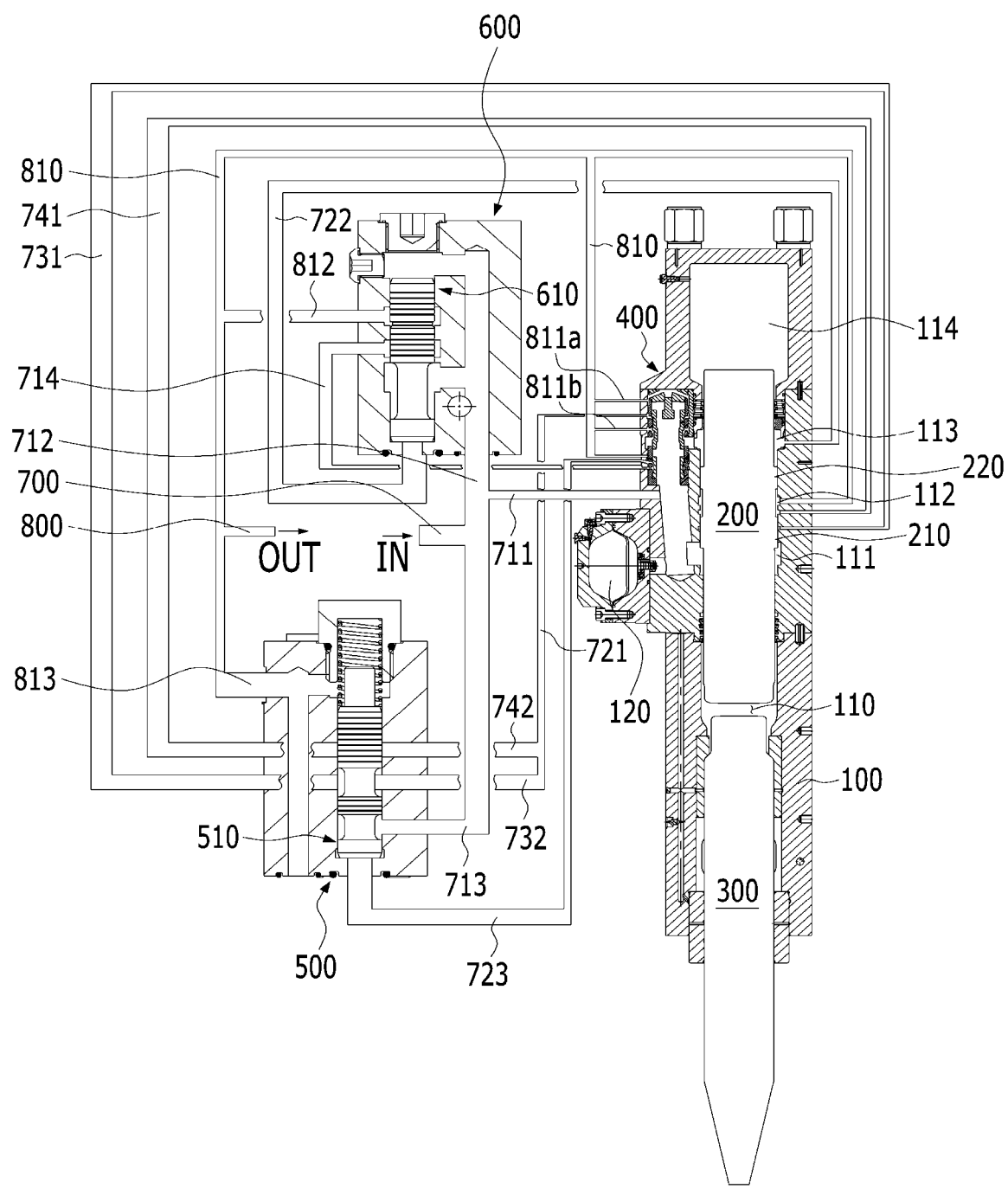
FIG. 1A is a view showing a hydraulic striking device according to an embodiment of the present invention.

Although a stroke force control valve 500 and a rock strength sensing valve 600 to be described below are disposed outside a cylinder 100 of a hydraulic striking device 10 in FIG. 1A etc., this is for convenience of description, and the stroke force control valve 500 and the rock strength sensing valve 600 may be construed as being disposed inside the cylinder 100, similar to a piston control valve 400.

Figure 2:
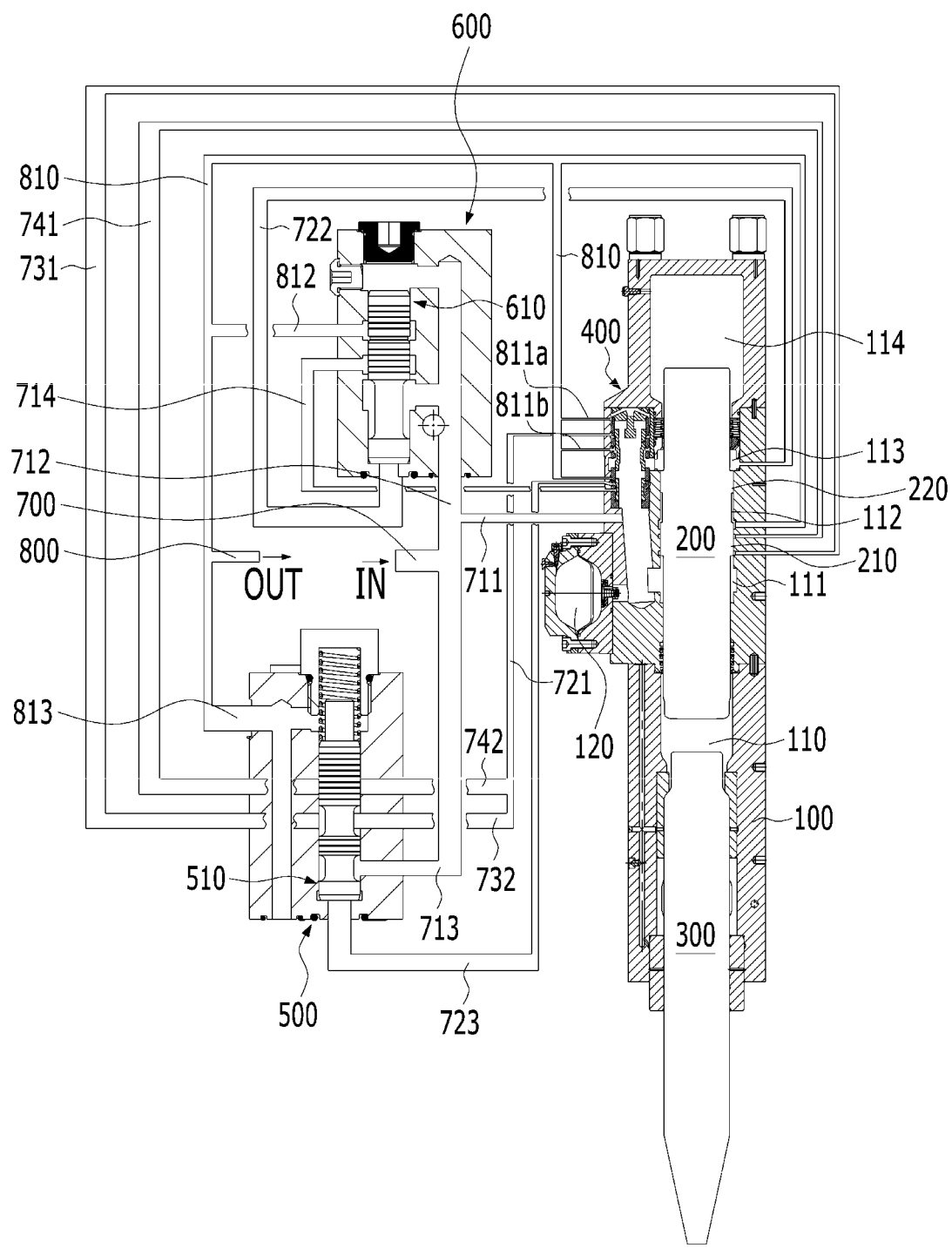
FIG. 2 is a view when a piston has been moved up to a first top dead center in the state of the hydraulic striking device shown in FIG. 1A.
Figure 7A:
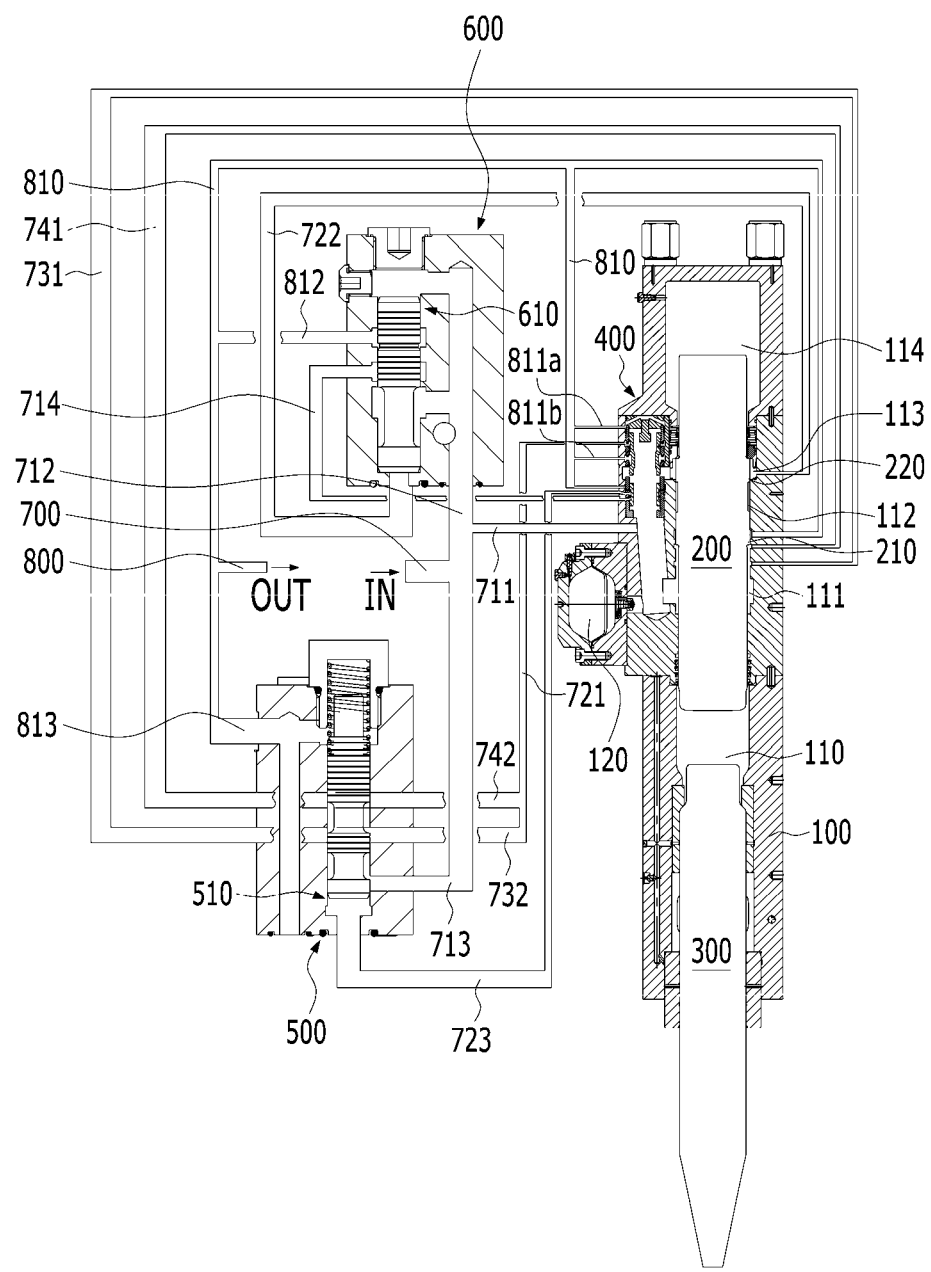
FIG. 7A is a view when the piston has been moved up to a second top dead center, the first spool of the stroke force control valve has been moved down, and the third supply line and the third actuating line are connected in the state of the hydraulic striking device shown in FIG. 6.

A first top dead center to be described hereafter means a state in which a piston 200 have moved up until a lower step 210 of the piston 200 is positioned over a first short-stroke line 731, as shown in FIG. 2, and a second top dead center means a state in which the piston 200 has moved up until the lower end 210 of the piston 200 is positioned over a first long-stroke line 741, as shown in FIG. 7A.

The joint between the first long-stroke line 741 and an intermediate chamber 112 is positioned higher than the joint between the first short-stroke line 731 and the intermediate chamber 112, so a second top dead center of the piston 200 is higher than the first top dead center.

Figure 4:
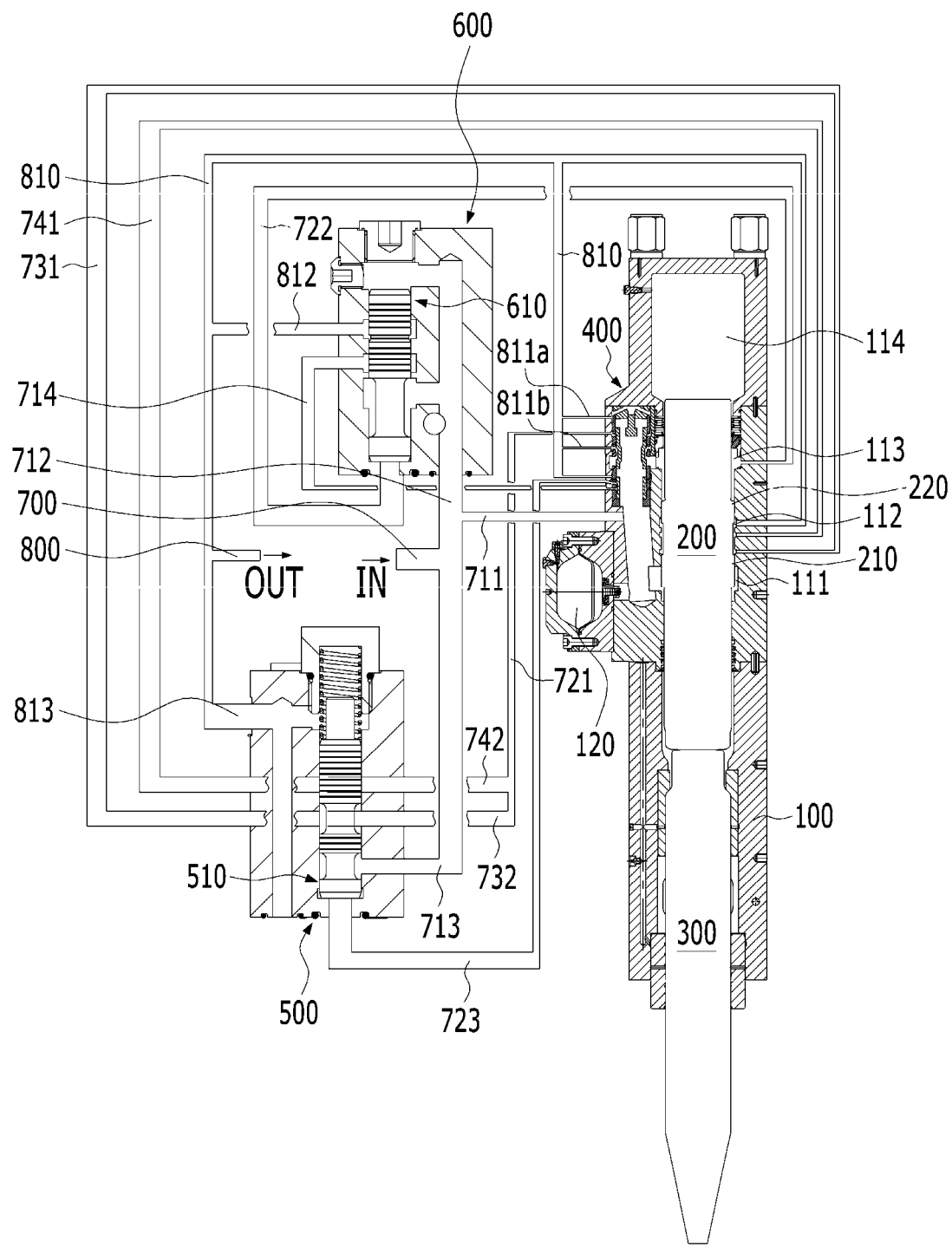
FIG. 4 is a view when the piston has been moved down to a bottom dead center in the state of the hydraulic striking device shown in FIG. 3A.

Further, the piston 200 has moved down with the bottom in contact with the top of a rod 300 at a bottom dead center, as shown in FIG. 4, which means that the piston strikes the top of the rod 300.

Hereinafter, embodiments of the present invention will be described with reference to the accompanying drawings.

Figure 1B:
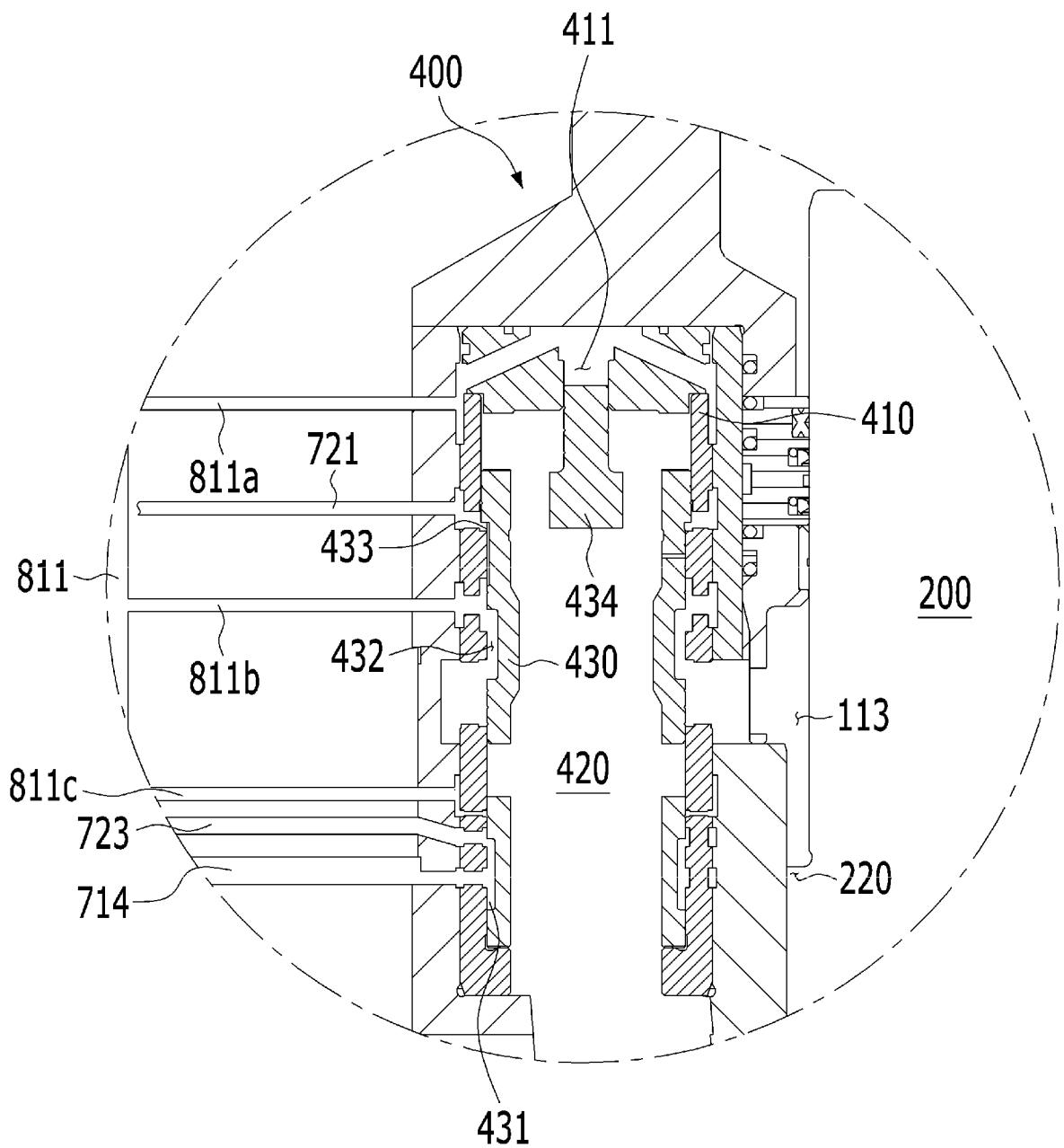
FIG. 1B is an enlarged view when a slider of the piston control valve shown in FIG. 1A has been moved down.
Figure 1C:
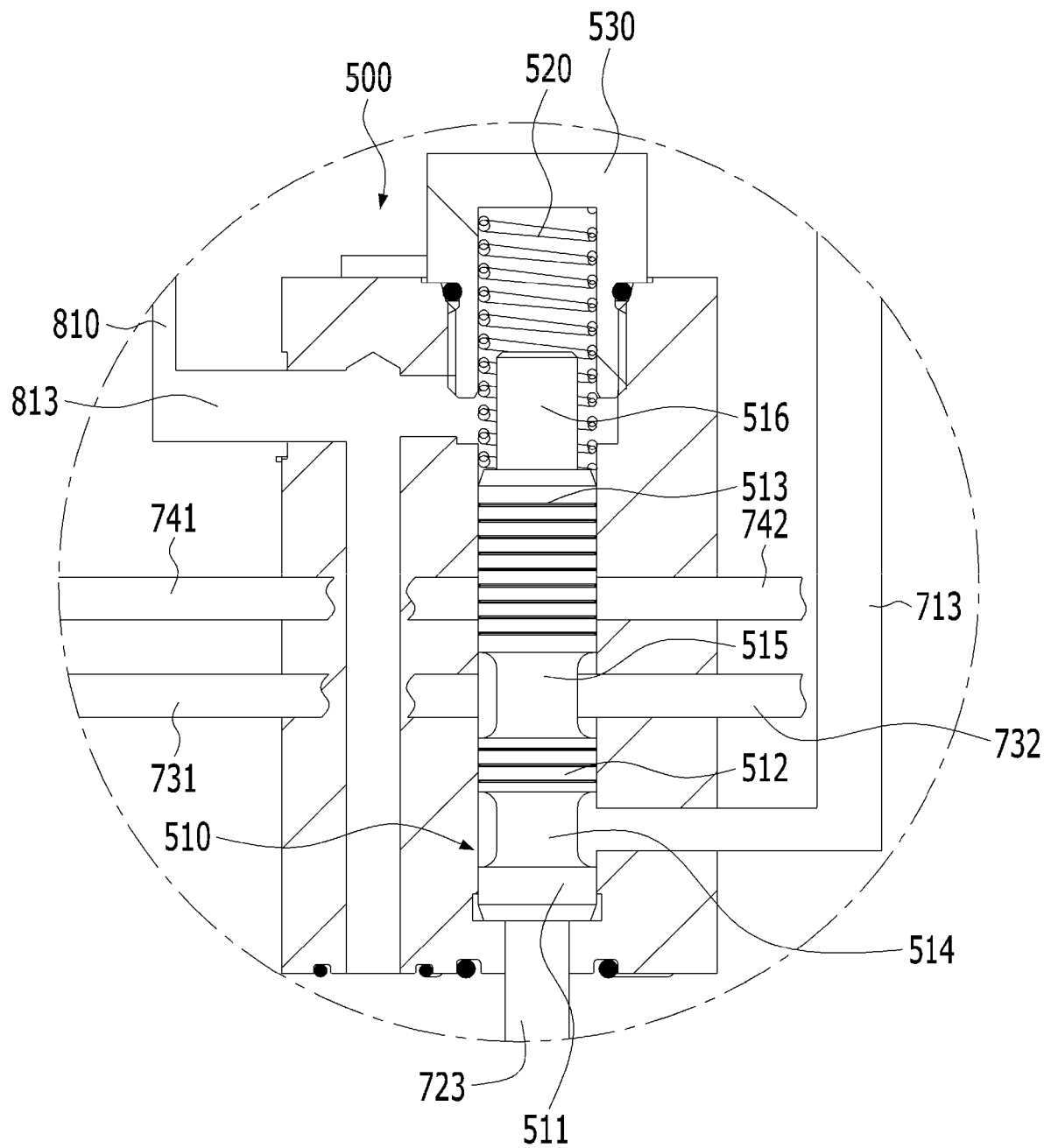
FIG. 1C is an enlarged view when a first spool of the stroke force control valve shown in FIG. 1A has been installed in a first installation posture and moved down.
Figure 1D:
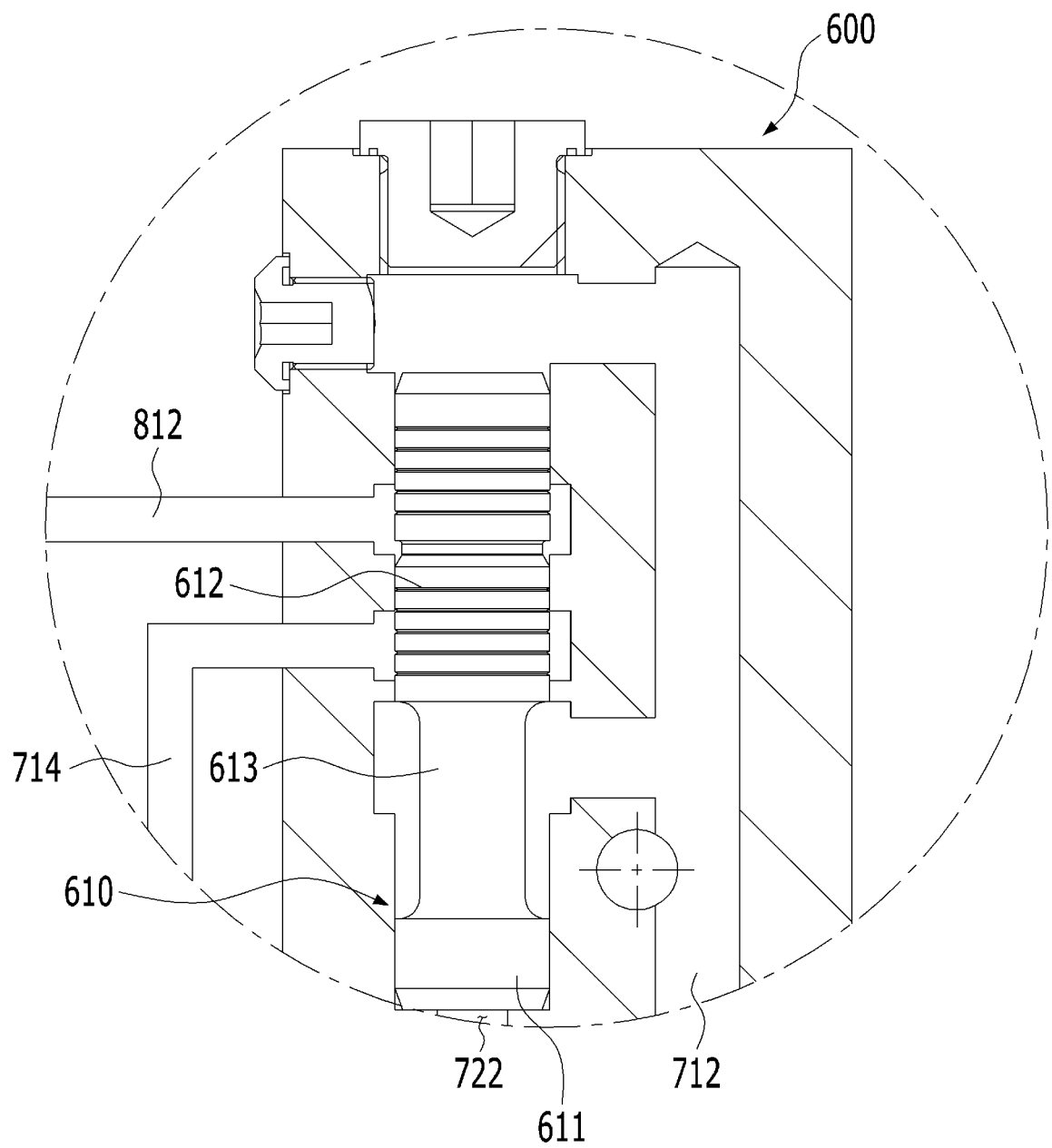
FIG. 1D is an enlarged view when a second spool of the rock strength sensing valve shown in FIG. 1A has been moved down.
Figure 3A:
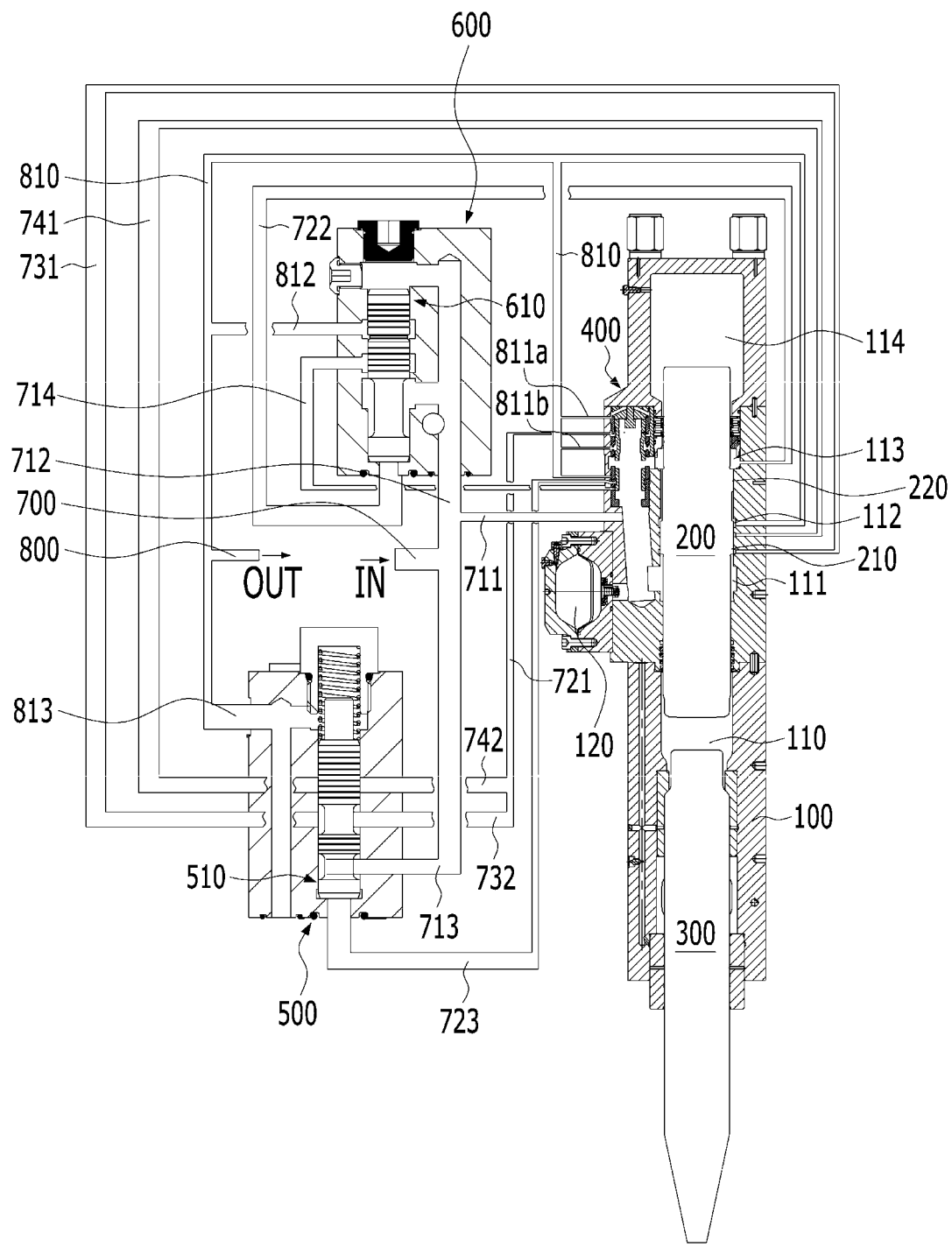
FIG. 3A is a view when the slider of the piston control valve has been moved down in the state of the hydraulic striking device shown in FIG. 2.
Figure 3B:
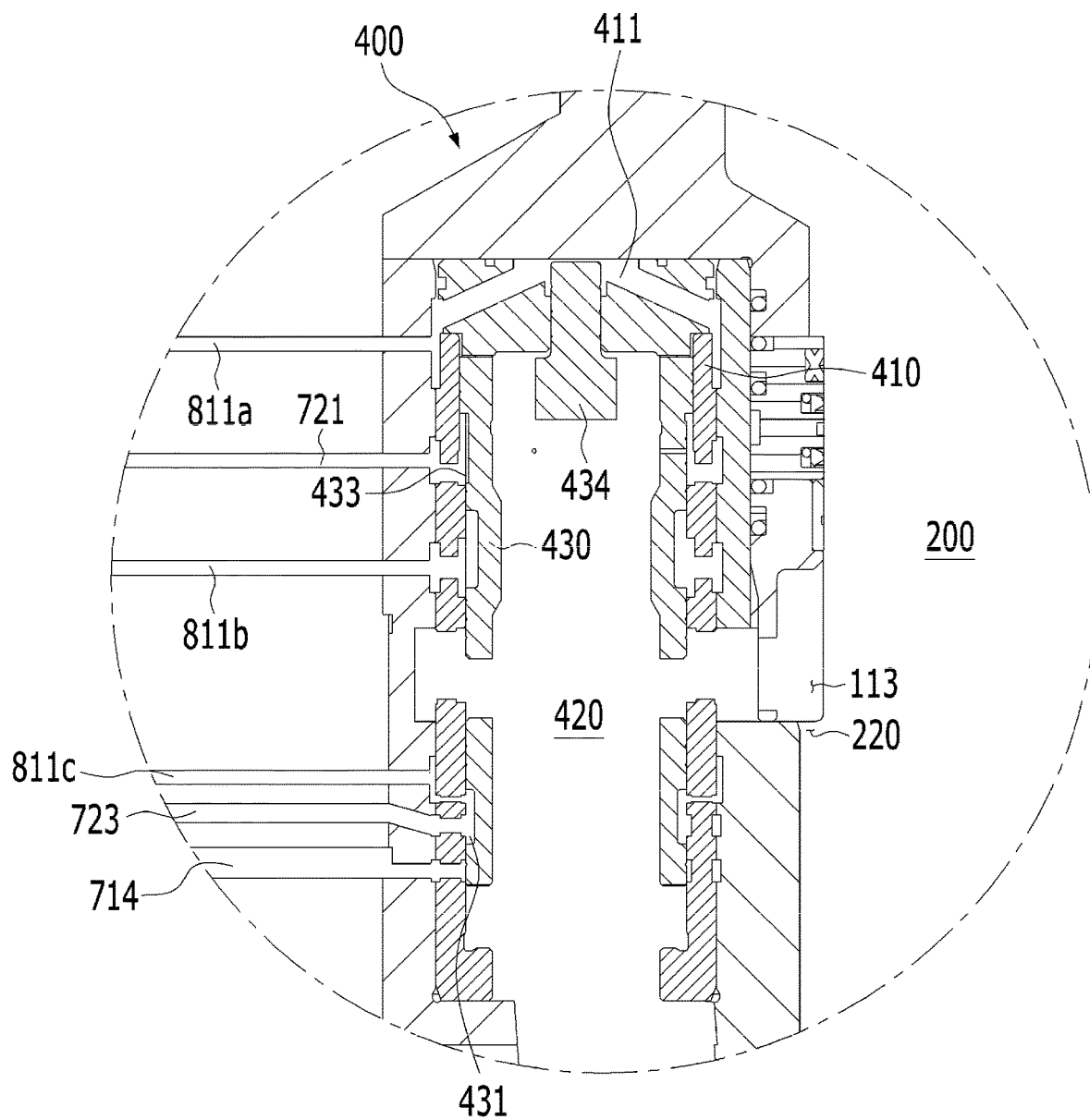
FIG. 3B is an enlarged view of the piston control valve shown in FIG. 3A.
Figure 5:
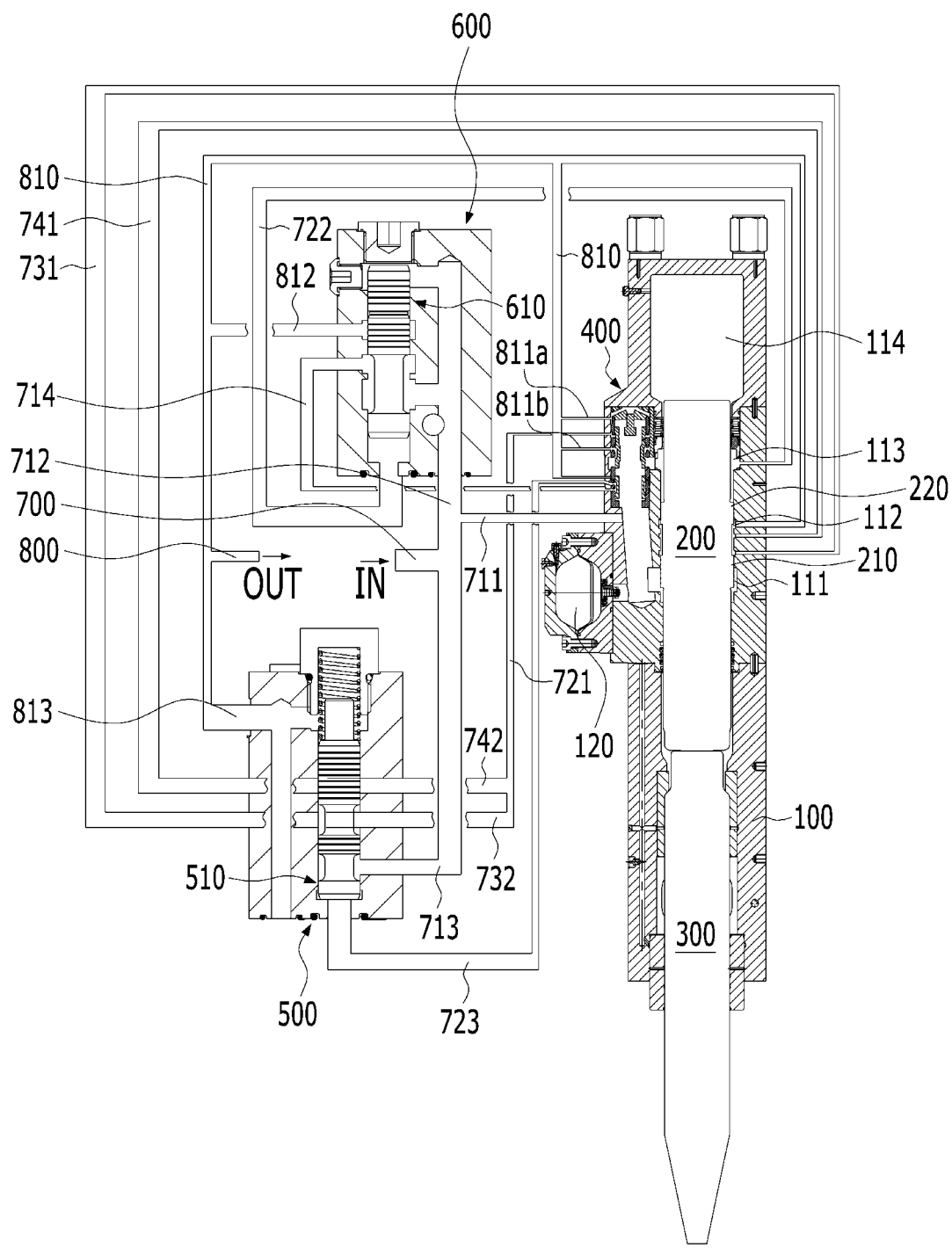
FIG. 5 is a view when a second spool of the rock strength sensing valve has been moved up in the state of the hydraulic striking device shown in FIG. 4.
Figure 6:
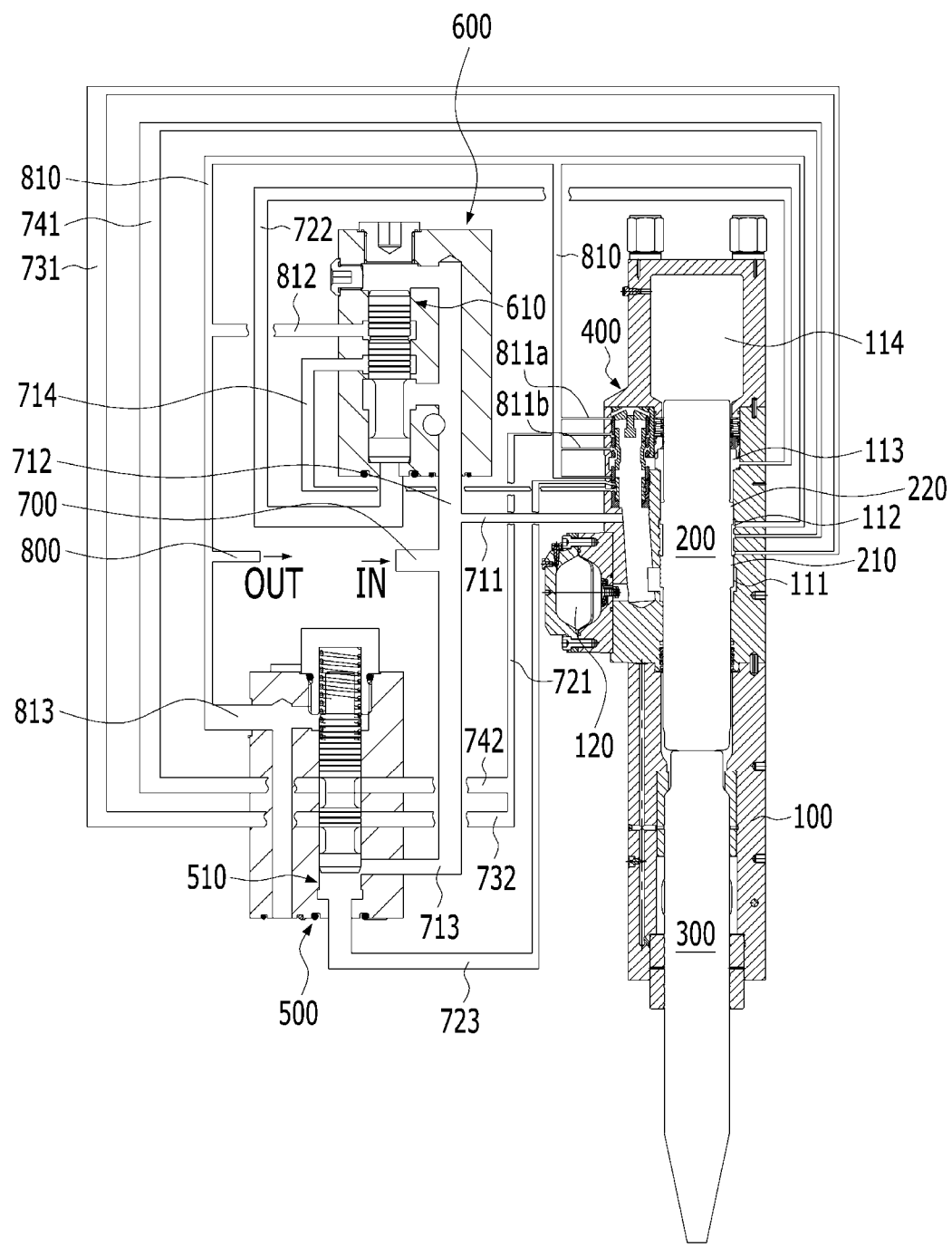
FIG. 6 is a view when the second spool of the rock strength sensing valve has been moved, the first spool of the stroke force control valve has been moved up, and a third supply line and a third actuating line are connected in the state of the hydraulic striking device shown in FIG. 5.
Figure 7B:
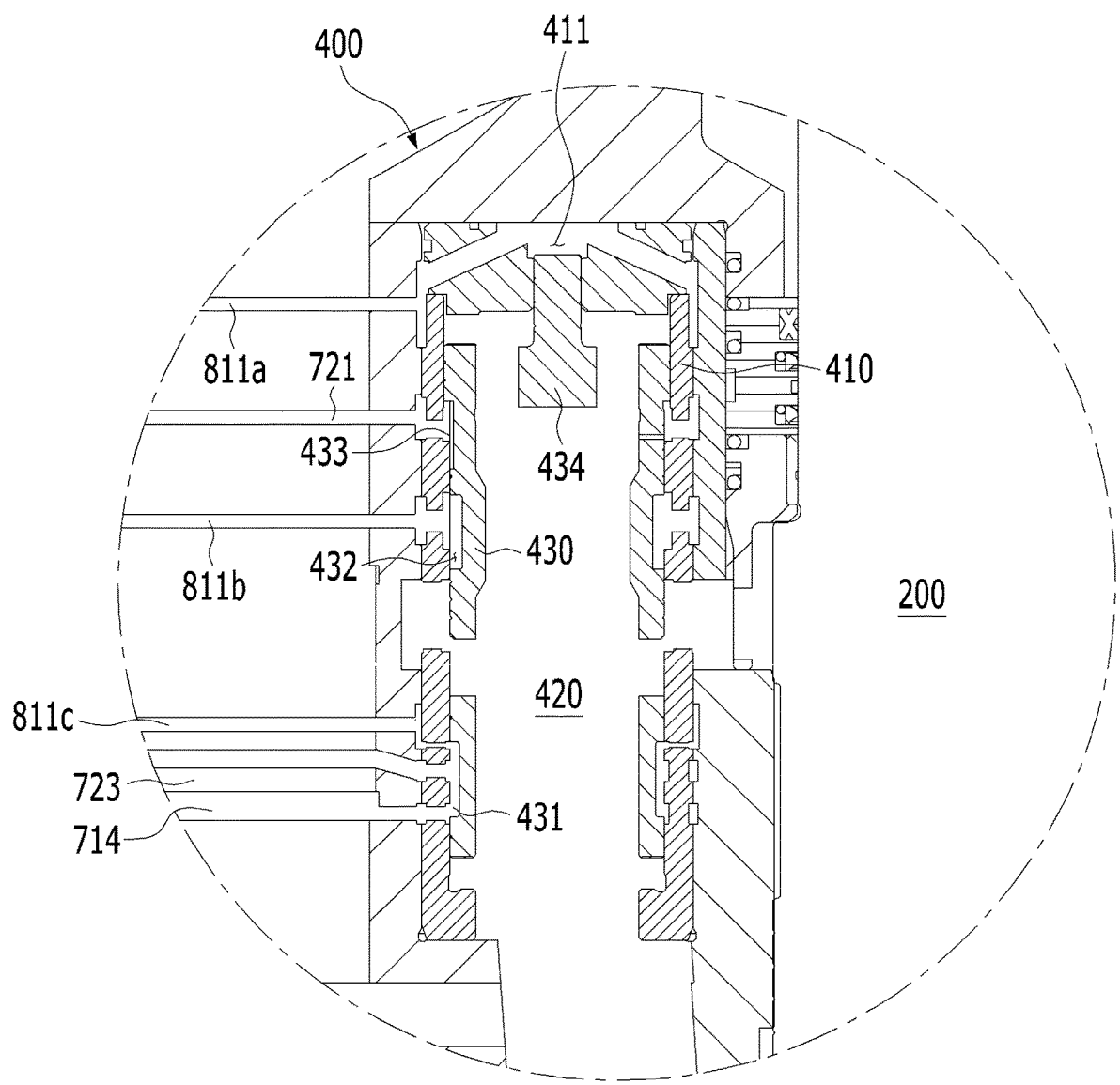
FIG. 7B is an enlarged view when the slider of the piston control valve shown in FIG. 7A has been moved to an intermediate position.
Figure 8:
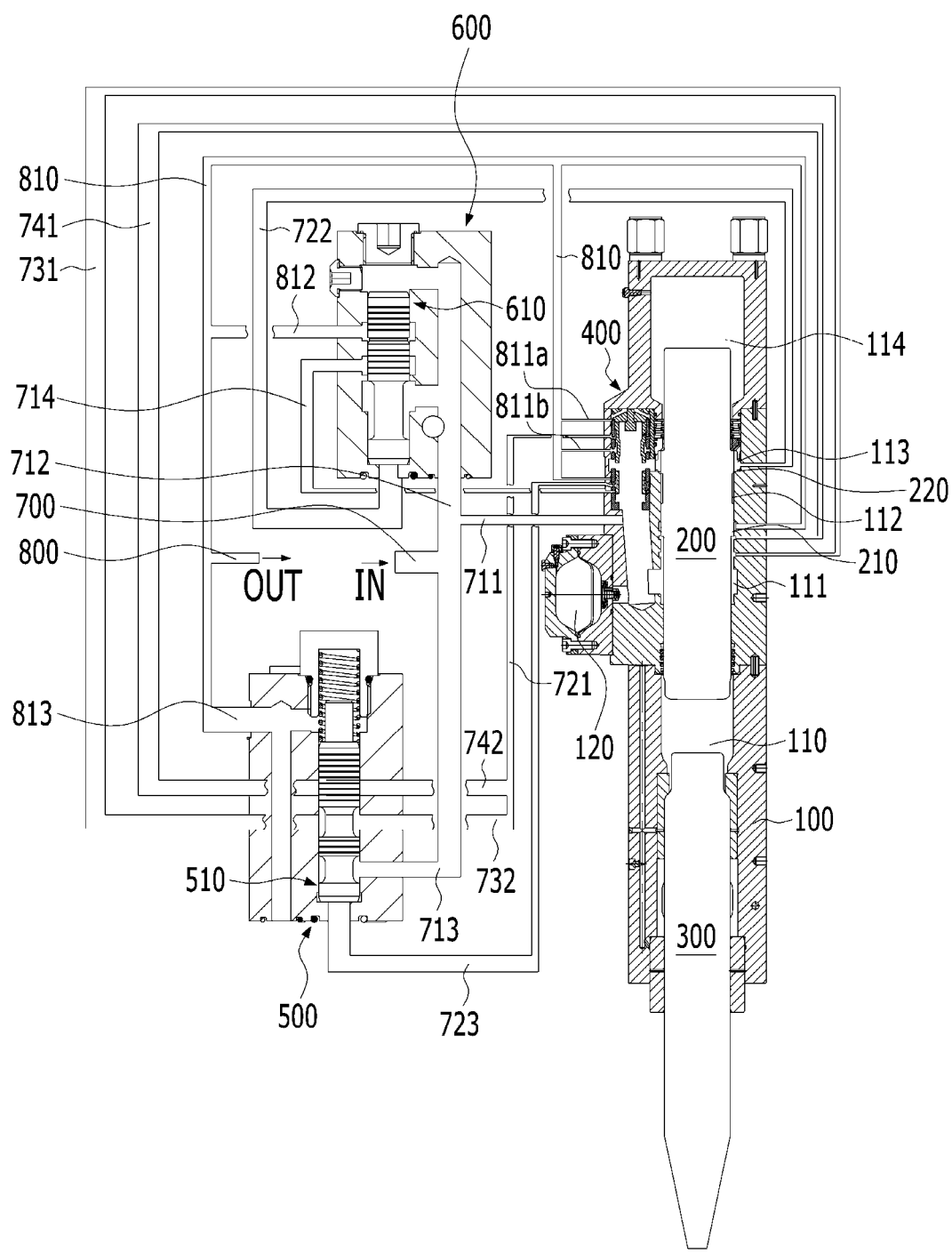
FIG. 8 is a view when the first spool of the stroke force control valve has been moved down in the state shown in FIG. 7A.
Figure 9:
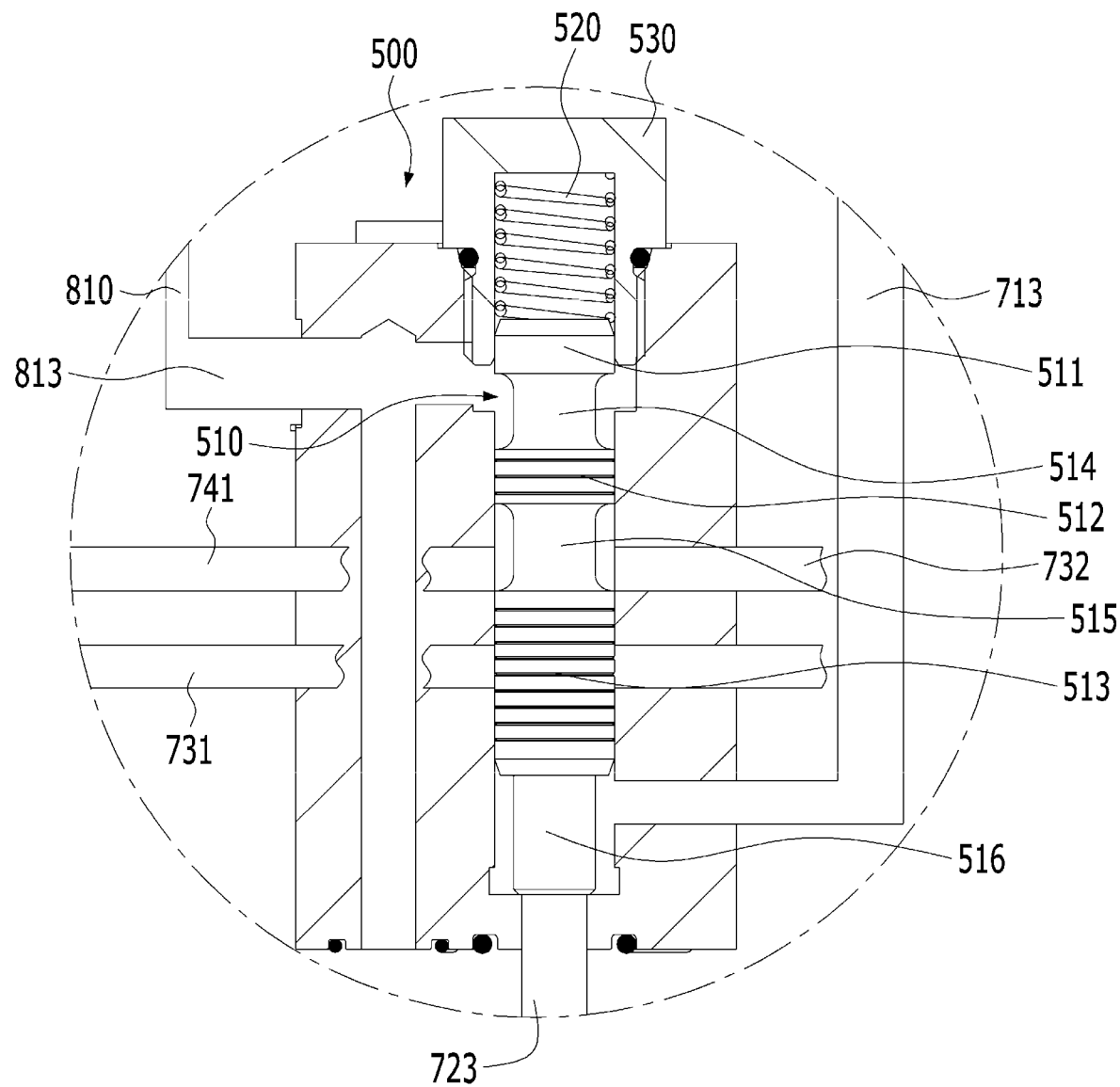
FIG. 9 is an enlarged view when the first spool of the stroke force control valve of the hydraulic striking device shown in FIG. 1A has been installed in a second installation posture.

FIG. 1A is a view showing a hydraulic striking device according to an embodiment of the present invention. FIG. 1B is an enlarged view when a slider of a piston control valve shown in FIG. 1A has been moved down. FIG. 1C is an enlarged view when a first spool of the stroke force control valve shown in FIG. 1A has been installed in a first installation posture and moved down. FIG. 1D is an enlarged view when a second spool of the rock strength sensing valve shown in FIG. 1A has been moved down. FIG. 2 is a view when a piston has been moved up to a first top dead center in the state of the hydraulic striking device shown in FIG. 1A. FIG. 3A is a view when the slider of the piston control valve has been moved down in the state of the hydraulic striking device shown in FIG. 2. FIG. 3B is an enlarged view of the piston control valve shown in FIG. 3A. FIG. 4 is a view when the piston has been moved down to a bottom dead center in the state of the hydraulic striking device shown in FIG. 3A. FIG. 5 is a view when a second spool of the rock strength sensing valve has been moved up in the state of the hydraulic striking device shown in FIG. 4. FIG. 6 is a view when the second spool of the rock strength sensing valve has been moved, the first spool of the stroke force control valve has been moved up, and a third supply line and a third actuating line are connected in the state of the hydraulic striking device shown in FIG. 5. FIG. 7A is a view when the piston has been moved up to a second top dead center, the first spool of the stroke force control valve has been moved down, and the third supply line and the third actuating line are connected in the state of the hydraulic striking device shown in FIG. 6. FIG. 7B is an enlarged view when the slider of the piston control valve shown in FIG. 7A has been moved to an intermediate position. FIG. 8 is a view when the first spool of the stroke force control valve has been moved down in the state shown in FIG. 7A. FIG. 9 is an enlarged view when the first spool of the stroke force control valve of the hydraulic striking device shown in FIG. 1A has been installed in a second installation posture.

As shown in FIGS. 1A to 1D, a hydraulic striking device 10 according to an embodiment of the present invention includes: an inlet port 1 through which working fluid flows inside; an outlet port 800 through which working fluid is discharged; a piston 200 that is disposed in a cylinder 100 to move up and down; a rod 300 that is struck by the piston 200 to break the ground; an upper chamber 113 that is formed at an upper portion between the piston 200 and the cylinder 100; a lower chamber 111 that is formed at a lower portion between the piston 200 and the cylinder 100; an intermediate chamber 112 that is formed between the upper chamber 113 and the lower chamber 111 between the piston 200 and the cylinder 100; a piston control valve 400 that controls up-down movement of the piston 200; a stroke force control valve 500 that controls the piston control valve 400; a rock strength sensing valve 600 that controls the stroke force control valve 500; a first supply line 711 that connects the inlet port 700 and the piston control valve 400; a second supply line 712 that connects the inlet port 700 and the rock strength sensing valve 600; a third supply line 713 that connects the inlet port 700 and the stroke force control valve 500; a fourth supply line 714 that connects the rock strength sensing valve 600 and the piston control valve 400; a first actuating line 721 that connects the stroke force control valve 500 and the piston control valve 400 by connecting a second short-stroke line 732, a second long-stroke line 742, and the piston control valve 400; a second actuating line 722 that connects the upper chamber 113 and the rock strength sensing valve 600; a third actuating line 723 that connects the stroke force control valve 500 and the piston control valve 400; a first short-stroke line that connects the intermediate chamber 112 and the stroke force control valve 500; the second short-stroke line 732 that connects the first short-stroke line 731 and the piston control valve 400 by connecting the first short-stroke line 731 and the first actuating line 721; a first long-stroke line 741 that connects the intermediate chamber 112 and the stroke force control valve 500 and is connected to the intermediate chamber 112 at a higher position than the first short-stroke line 731; a second long-stroke line 742 that connects the first long-stroke line 741 and the piston control valve 400 by connecting the first long-stroke line 741 and the first actuating line 721; a first discharge line 811 that connects the outlet port 800 and the stroke force control valve 500 by connecting a main discharge line 810 and the stroke force control valve 500; and a third discharge line 813 that connects the outlet port 800 and the stroke force control valve 500 by connecting the main discharge line 810 and the stroke force control valve 500.

Inlet Port (700) & Outlet Port (800)

The inlet port 700 is a passage through which working fluid flows inside when it is supplied into the hydraulic striking device 10 and the outlet port 800 is a passage through which working fluid is discharged when it is returned out of the hydraulic striking device 10.

The inlet port 700 is connected to a high-pressure line through which working fluid is supplied by a pump (not shown) and the outlet port 800 is connected to a low-pressure line through which working fluid is sucked by the pump (not shown).

The high-pressure line and the low-pressure line are connected to each other outside the hydraulic striking device 10, and the high-pressure line, the low-pressure line, and the hydraulic striking device 10 make one hydraulic circuit.

Accordingly, when the pump is operated, working fluid is supplied into the hydraulic striking device 10, that is, into the cylinder 100 through the high-pressure line and the inlet port 700, in which the working fluid is supplied at high pressure.

Further, the working fluid at high pressure is discharged out of the hydraulic striking device 10, that is, out of the cylinder 100 sequentially through valves and lines, which will be described below, the low-pressure line, and the outlet port 800, in which the working fluid is sucked, discharged, and returned at low pressure.

As described above, although the inlet port 700 and the outlet port 800 are disposed outside the cylinder 100 in FIG. 1A etc., this is for convenience of description, and the inlet port 700 and the outlet port 800 may be formed at the cylinder 100.

Cylinder (100)

The cylinder 100 is described hereafter.

A hole 110 is formed in the cylinder 100 and the piston 200 is disposed in the hole 110 to move up and down.

A gas chamber 114 is formed at an upper portion in the hole 110 and the rod 300 that is struck by the piston 200 is disposed to move up and down at a lower portion in the hole 110.

The piston control valve 400, the rock strength sensing valve 600, the stroke force control valve 500, and an accumulator 200 are connected to the cylinder 100.

The lower chamber 111 is a space defined by the bottom of a lower step 210 of the piston 200 and the inside of the cylinder 100, that is, the hole 110.

High-pressure working fluid flows into the lower chamber 111 and moves up the piston 200, and the lower chamber 111 is connected to the inlet port 700 through the first supply line 711 and the piston control valve chamber 420.

The intermediate chamber 112 is a space positioned over the lower chamber 111 and defined by the inside of the cylinder 100, that is, the hole 110 between an upper step 220 and the lower step 210 of the piston 200.

The intermediate chamber 112 is connected to the first and second short-stroke lines 731 and 732, the first and second long-stroke lines 741 and 742, and the main discharge line 810, which will be described in detail below.

The upper chamber 113 is a space defined by the top of the upper step 220 of the piston 200 and the inside of the cylinder 100, that is, the hole 110.

High-pressure working fluid flows into the upper chamber 113 and moves down the piston 200 and the upper chamber 113 is connected to the rock strength sensing valve 600 through the second actuating line 722.

The gas chamber 114 is a space at the uppermost portion of the hole 110 and is filled with nitrogen gas.

The nitrogen gas in the gas chamber 114 prevents the piston 200 that is being moved up from coming in contact with the top of the gas chamber 114 and the pressure of the nitrogen gas contributes to moving down the piston 200 by pushing down the piston 200.

The accumulator 120 prevents backflow of working fluid due to an increase in pressure in the lower chamber 111 by preventing a instantaneous increase in pressure of the lower chamber 111 when the piston 200 moves down to the bottom dead center and strikes the rod 300, using nitrogen gas filled therein.

Piston (200)

The piston 200 is described hereafter.

As shown in FIG. 1A, the piston 200 is disposed to move up and down in the hole 110 inside the cylinder 100 and has the lower step 210 at the lower portion and the upper step 220 at the upper portion.

Accordingly, when high-pressure working fluid is supplied into the lower chamber 111, it pushes up the lower step 210, so the piston 200 is moved up.

Further, when high-pressure working fluid is supplied into the upper chamber 113, it pushes down the upper step 220, so the piston 200 is moved down.

When working fluid is supplied into the upper chamber 113 and the piston 200 is moved down, the piston 200 strikes the rod 300 under the piston 200.

The rod 300 struck by the piston 200 moves down and strikes the ground, so the ground can be broken.

The lower step 210 and the upper step 220 of the piston 200 has the same diameter as the diameter of the hole 110.

The hydraulic area of the upper step 220 is larger than the hydraulic area of the lower step 210. In other words, the width of the upper step 220 is larger than the width of the lower step 210, so the hydraulic area to which working fluid is applied is larger at the upper step 220 than the lower step 210.

Therefore, when high-pressure working fluid is simultaneously supplied into the upper chamber 113 and the lower chamber 111, a larger force pushes down the upper step 220, so the piston 200 can be easily moved down.

Piston Control Valve (400)

The piston control valve 400 is described hereafter.

The piston control valve 400 controls up-down movement of the piston 200 by selectively controlling working fluid that is supplied to the upper chamber 113.

The piston control valve 400, as shown in FIGS. 1A and 1B, is connected with the inlet port 700 through the first supply line 711, connected with the second short-stroke line 732 and the second long-stroke line 742 through the first actuating line 721, connected with the stroke force control valve 500 through the third actuating line 723, connected with the rock strength sensing valve 600 through the fourth supply line 714, and connected with the outlet port 800 through the first discharge line 811, a 1-1 discharge line 811a, a 1-2 discharge line 811b, and a 1-3 discharge line 811c.

Further, the piston control valve 400, as shown in FIGS. 1A and 1B, is disposed in the cylinder 100 of the hydraulic striking device 10 and has a body 410 fixed in the cylinder 410, a piston control valve chamber 420 formed in the body 410, a slider 430 disposed to move up and down between the body 410 and the piston control valve chamber 420, and first to third grooves 431, 432, and 433 formed at the slider 430.

The body 410 is a portion, which is fixed in the cylinder 100, of the piston control valve 400, and the outer side of the body 410 is connected to the fourth supply line 714, the first actuating line 721, the third actuating line 723, the 1-1 discharge line 811a, the 1-2 discharge line 811b, and the 1-3 discharge line 811c.

An insertion chamber 411 in which an insertion 434 of the slider 430 is inserted is formed in the top of the body 410.

The insertion chamber 411 is connected to the 1-1 discharge line 811a and the insertion 434 is inserted in the lower portion of the insertion chamber 411.

Accordingly, working fluid flowing in the insertion chamber 411 can be discharged out of the cylinder 100 through the 1-1 discharge line 811a.

The piston control valve chamber 420 means a space formed inside the body 410 and connects the accumulator 120, the lower chamber 111, and the upper chamber 113 to the first supply line 711.

The slider 430 is in close contact with the inner side of the body 410, and can slide up and down between the body 410 and the piston control valve chamber 420 when working fluid is supplied.

The operation of the slider 430 is determined in accordance with whether working line is supplied into the first actuating line 721.

When the slider 430 has moved down, as shown in FIG. 1B, that is, when the slider 430 is positioned at a lower portion inside the body 410, the piston control valve chamber 420 and the upper chamber 113 are disconnected, so it is possible to block high-pressure working fluid that is supplied to the upper chamber 113.

When the slider 430 has moved up, as shown in FIG. 3B, that is, when the slider 430 is positioned at an upper portion inside the body 410, the piston control valve chamber 420 and the upper chamber 113 are connected, so it is possible to allow high-pressure working fluid to be supplied to the upper chamber 113.

The slider 430 has the insertion 434 that is inserted in the insertion chamber 411 of the body 410, and the first to third grooves 431, 432, and 433.

The insertion 434 is inserted in the insertion chamber 411 of the body 410 and helps the slider 430 move up and down straight in a predetermined position without inclining.

The first groove 431 connects the fourth supply line 714 and the third actuating line 723, when it is positioned at a down-position, as shown in FIG. 1B, or when it is positioned at an intermediate position.

Accordingly, when the slider 430 is positioned at the down-position or the intermediate position, working fluid supplied into the fourth supply line 714 is supplied to the stroke force control valve 500 through the first groove 431 and the third actuating line 723, whereby it can operate the stroke force control valve 500.

However, due to the structure of the first groove 431 described above, when the slider 430 is positioned at an up-position, as shown in FIG. 3B, that is, when the slider 430 is positioned at the upper portion in the body 410, the fourth supply line 714 and the third actuating line 723 are disconnected and the third actuating line 723 is connected to the 1-3 discharge line 811c through the first groove 431.

Accordingly, the working fluid remaining in the third actuating line 723 can be easily discharged out of the cylinder 100 through the 1-3 discharge line 811c.

In other words, the working fluid remaining in the third actuating line 723 is discharged out of the outlet port 800 through the 1-3 discharge line 811c, the first discharge line 811, and the main discharge line 810, so it can be easily returned to the outside of the hydraulic striking device 10.

The second groove 432 is connected to the 1-2 discharge line 811b and the upper chamber 113 when the slider 430 is positioned at the down-position.

Accordingly, when the slider 430 is positioned at the down-position, the working fluid in the upper chamber 113 can be discharged out of the cylinder 100 through the 1-2 discharge line 811b, and accordingly, the piston 200 can be easily moved up.

In other words, the working fluid remaining in the upper chamber 113 is discharged out of the outlet port 800 through the 1-2 discharge line 811b, the first discharge line 811, and the main discharge line 810, so it can be easily returned to the outside of the hydraulic striking device 10 and accordingly the piston 200 can be easily moved up.

The third groove 433 is connected to the first actuating line 721, and when high-pressure working fluid is supplied into the first actuating line 721, the working fluid presses the third groove 433, thereby moving up the slider 430.

Accordingly, when working fluid is supplied into the third groove 433 through the first actuating line 721, the slider 430 is moved up and the working fluid can be supplied into the upper chamber 113, whereby the piston can be moved down.

Stroke Force Control Valve (500)

The stroke force control valve 500 is described hereafter.

The stroke force control valve 500 controls the piston control valve 400 by controlling the point of timing when the piston control valve 400 supplies working fluid to the upper chamber 113 and includes a first spool 510 that operates the stroke force control valve 500.

The stroke force control valve 500, as shown in FIGS. 1A and 1C, is connected to the inlet port 700 through the third supply line 713, connected to the piston control valve 400 through the third actuating line 723, and connected to the outlet port 800 through the third discharge line 813 and the main discharge line 810.

Since the fourth supply line 714 connects the rock strength sensing valve 600 and the piston control valve 400, the stroke force control valve is indirectly connected to the rock strength sensing valve 600 through the fourth supply line 714 and the third actuating line 723.

Further, the stroke force control valve is connected to the intermediate chamber 112 through the first short-stroke line 731 and connected to the piston control valve 400 through the second short-stroke line 732 and the first actuating line 721.

Further, the stroke force control valve is connected to the intermediate chamber 112 through the first long-stroke line 741 and connected to the piston control valve 400 through the second long-stroke line 742 and the first actuating line 721.

The first spool 510, as shown in FIG. 1C, is disposed in the stroke force control valve 500 and has a first spool lower pressing surface 511 forming the bottom of the first spool 510, a first spool lower blocking portion 512 formed over the first spool lower pressing surface 511, a first spool upper blocking portion 513 formed over the first spool lower blocking portion 512, a first spool upper pressing surface 516 forming the top of the first spool 510, a first spool lower bridge 514 formed between the first spool lower pressing surface 511 and the first spool lower blocking portion 512, and a first spool upper bridge 515 formed between the first spool lower blocking portion 512 and the first spool upper blocking portion 513.

The first spool 510 may be switched into a first installation posture or a second installation posture, depending on the position where is it installed in the stroke force control valve 500.

The first installation posture means that the first spool lower pressing surface 511 is positioned toward the third actuating line 723 in the stroke force control valve 500, as shown in FIG. 1C.

In the first installation posture, the first spool upper pressing surface 516 is inserted in a first spring 520 and the first spring 520 elastically presses the top of the first spool upper blocking portion 513.

Further, in the first installation posture, working fluid supplied through the third actuating line 723 presses the first spool lower pressing surface 511, whereby the stroke force control valve 500 is operated.

The second installation posture means that the first spool upper pressing surface 516 is positioned toward the third actuating line 723 in the stroke force control valve 500, as shown in FIG. 9.

In other words, in the second installation posture, the first spool 510 is turned upside down from the first installation posture in the stroke force control valve 500.

In the second installation posture, the first spool lower pressing surface 511 is positioned toward the first spring 520 and presses the first spring 520.

Further, in the second installation posture, working fluid supplied through the third actuating line 723 presses the first spool upper pressing surface 516, whereby the stroke force control valve 500 is operated.

The first spool 510 has different functions, depending on the first installation posture and the second installation posture, and the case when the first spool 510 is in the first installation posture is described hereafter, and the case when the first spool 510 is in the second installation posture will be described below.

Assuming that the first spool 510 is in the first installation posture, when the first spool 510 is positioned at a down-position, as shown in FIG. 1C, the first short-stroke line 731 and the second short-stroke line 732 are connected through the first spool upper bridge 515, the first long-stroke line 741 and the second long-stroke line 742 are disconnected by the first spool upper blocking portion 513, and the third supply line 713 and the third actuating line 723 are disconnected by the first spool lower pressing surface 511.

Accordingly, in the state shown in FIG. 1C, that is, when the first spool 510 is in the first installation posture and positioned at the down-position and the piston 200 is moved up, the working fluid in the intermediate chamber 112 is supplied to the piston control valve 400 through the first short-stroke line 731, the second short-stroke line 732, and the first actuating line 721 and the piston 200 is positioned at the first top dead center.

A striking mode in which the piston 200 is positioned at the first top dead center is called a short-stroke mode, which will be described in detail below.

Assuming that the first spool 510 is in the first installation position, when the first spool 510 is positioned at an up-position, as shown in FIG. 6, the first short-stroke line 731 and the second short-stroke line 732 are disconnected by the first spool lower bridge 514, the first long-stroke line 741 and the second long-stroke line 742 are connected through the first spool upper bridge 515, and the third supply line 713 and the third actuating line 723 are connected.

Accordingly, in the state shown in FIG. 6, that is, when the first spool 510 is in the first installation posture and positioned at the up-position and the piston 200 is moved up, the working fluid in the intermediate chamber 112 is supplied to the piston control valve 400 through the first long-stroke line 741, the second long-stroke line 742, and the first actuating line 721 and the piston 200 is positioned at the second top dead center.

A striking mode in which the piston 200 is positioned at the second top dead center is called a long-stroke mode, which will be described in detail below.

Further, the cover 530 that covers the space where the first spring 520 and the first spool 510 are installed may be detachably coupled to the stroke force control valve 500 to easily change the first installation posture and the second installation posture of the first spool 510.

Rock Strength Sensing Valve (600)

The rock strength sensing valve 600 is described hereafter.

The rock strength sensing valve 600 controls the operation of the stroke force control valve 500 by supplying working fluid to the stroke force control valve 500 and includes a second spool 610 that operates the rock strength sensing valve 600.

The rock strength sensing valve 600 is connected to the inlet port 700 through the second supply line 712, as shown in FIGS. 1A and 1D.

The rock strength sensing valve is connected to the piston control valve 400 through the fourth supply line 714, connected to the upper chamber 113 through the second actuating line 722, and connected to the outlet port 800 through the second discharge line 812 and the main discharge line 810.

Since the third supply line 723 connects the stroke force control valve 500 and the piston control valve 400, the rock strength sensing valve is indirectly connected to the stroke force control valve 500 through the fourth supply line 714 and the third actuating line 723.

According to this configuration, the operation of the rock strength sensing valve 600 is controlled in accordance with the strength of the ground that is broken by the rod 300, which will be described in detail below.

The second spool 610 is disposed in the rock strength sensing valve, as shown in FIG. 1D.

The second spool has a second spool pressing surface 611 forming the bottom of the second spool 610, a second spool blocking portion 612 formed over the second spool pressing surface 611, and a second spool bridge 613 formed between the second spool pressing surface 611 and the second spool blocking portion 612.

The second spool 610 is installed such that the second spool pressing portion 611 faces the second actuating line 722. Accordingly, the working fluid supplied through the second actuating line 722 presses the second spool pressing surface 611, so the rock strength sensing valve 600 is operated.

When the second spool 610 is positioned at a down-position, as shown in FIG. 1D, the second spool blocking portion 612 disconnects the second supply line 712 and the fourth supply line 714.

Further, as shown in FIG. 5, as working fluid is supplied through the second actuating line 722 and the second spool pressing surface 611 of the second spool 610 is pressed, the second spool bridge 613 connects the second supply line 712 and the fourth supply line 714.

Operation of Breaking Ground by Hydraulic Striking Device (10) According to Embodiment of Present Invention The operation of breaking the ground by the hydraulic striking device 10 according to an embodiment of present invention is described hereafter.

Stroke modes of the hydraulic striking device 10 according to an embodiment of the present invention can be automatically changed by working fluid that flows through the valves and lines of the hydraulic striking device 10 in accordance with the strength of rocks in the ground to be broken by the rod 300.

Accordingly, unlike hydraulic striking devices in the related art, a user does not need to check the status of rocks and change the stroke modes.

In detail, when the hydraulic striking device 10 strikes ground generally composed of weak rocks having a low strength, the rock strength sensing valve 600 is not operated, so, as shown in FIG. 2, the hydraulic striking device breaks the ground in a short-stroke mode in which the piston 200 is moved up to the first top dead center.

As shown in FIG. 2, the first top dead center is a point where the piston 200 is moved until the lower step 210 of the piston 200 is positioned over the first short-stroke line 731.

On the other hand, when the hydraulic striking device 10 strikes ground generally composed of hard rocks having a high strength, the rock strength sensing valve 600 is operated, so, as shown in FIG. 7A, the hydraulic striking device breaks the ground in a long-stroke mode in which the piston 200 is moved up to the second top dead center.

In the long-stroke mode, the piston 200 moves up to the second top dead center and strikes the rod 300, so a larger force (or shock) is applied to the rod 300 than in the short-stroke mode. This is because the second top dead center is higher than the first top dead center.

Therefore, the force that the rod 300 breaks the ground with is also strong, which is very effective for breaking hard rocks.

Breaking Ground in Short-Stroke Mode

A case when the hydraulic striking device 10 according to an embodiment of the present invention breaks ground generally composed of weak rocks in a short-stroke mode is described in detail hereafter.

Breaking of ground in a short-stroke mode by the hydraulic striking device 10 according to an embodiment of the present invention is performed in order of FIGS. 1A, 2, 3A, and 4.

First, the rod 300 of the hydraulic striking device 10 is put on the ground to break weak rocks in the ground, thereby preparing to break the ground.

Next, in the status of the hydraulic striking device 10 shown in FIG. 1A, when high-pressure working fluid is supplied through the high-pressure line and flows into the hydraulic striking device 10 through the inlet port 700, the high-pressure working fluid flows through the first to third supply line 713.

In this case, since the second supply line 712 is blocked by the second spool blocking portion 612 of the second spool 610 of the rock strength sensing valve 600, the working fluid in the second supply line 712 cannot flow into the fourth supply line 714.

Further, since the third supply line 713 is blocked by the first spool lower blocking portion 512 of the first spool 510 of the stroke force control valve 500, the working fluid in the third supply line 713 cannot flow into the third supply line 723.

On the other hand, the working fluid flowing through the first supply line 711 is supplied into the lower chamber 111 through the piston control valve 400 and the cylinder 100.

The high-pressure working fluid flowing in the lower chamber 111 pushes up the bottom of the lower step 210 of the piston 200, so the piston 200 is moved up to the first top dead center, as shown in FIG. 2.

As the piston 200 is moved up, as described above, the working fluid remaining in the upper chamber 113 flows into the first discharge line 811 through the second groove 432 of the piston control valve 400 and the 1-2 discharge line 811*b*. Further, the working fluid flowing in the first discharge line 811 is discharged and returned outside the hydraulic striking device 10 through the main discharge line 810 and the outlet port 800.

Accordingly, the internal pressure of the upper chamber 113 is reduced, and accordingly, the piston 200 can be easily moved up.

When the piston 200 is moved up to the first top dead center, the lower chamber 111 and the first short-stroke line 731 are connected, so the high-pressure working fluid in the lower chamber 111 flows into the piston control valve 400 through the first short-stroke line 731, the second short-stroke line 732, and the first actuating line 721.

The working fluid flowing in the piston control valve 400 through the first actuating line 721 presses the third groove 433 formed at the slider 430 of the piston control valve 400, so the slider 430 is moved up to the up-position, as shown in FIGS. 3A and 3B.

As the slider 430 is moved up, the piston control valve chamber 420 and the upper chamber 113 are connected, so the high-pressure working fluid supplied to the piston control valve chamber 420 flows into the upper chamber 113.

The high-pressure working fluid flowing in the upper chamber 113 pushes down the top of the upper step 220 of the piston 200, so the piston 200 is moved down to the bottom dead center, as shown in FIG. 4.

As the piston 200 is moved down, as described above, the working fluid remaining in the lower chamber 111 is discharged and returned outside the hydraulic striking device 10 through the main discharge line 810 and the outlet port 800.

Accordingly, the internal pressure of the lower chamber 111 is reduced, and accordingly, the piston 200 can be easily moved down.

As the piston 200 is moved down to the bottom dead center, the bottom of the piston 200 strikes the top of the rod 300 and the rod 300 is moved down by the shock and breaks a weak rock in the ground.

When the rod 300 breaks a weak rock, a reacting force is transmitted to the piston 200. In this case, since a weak rock has a low strength, the reacting force transmitted to the piston 200 is relatively small, so the pressure of the working fluid in the upper chamber 113 is slightly increased.

Accordingly, the pressure of the working fluid in the second actuating line 722 connected to the upper chamber 113 is also not enough to move up the second spool 610 of the rock strength sensing valve 600, so the rock strength sensing valve 600 is maintained at the down-position without moving up, as shown in FIG. 1D.

Further, when the piston 200 is positioned at the bottom dead center, the main discharge line 810, the intermediate chamber 112, and the first short-stroke line 731 are connected, so the working fluid supplied through the first actuating line 721 pushes the third groove 433. Accordingly, the working fluid that has pushed up the slider 430 is discharged through the main discharge line 810 and the outlet port 800, so the slider 430 of the piston control valve 400 is returned back down to the down-position, as shown in FIG. 4.

When the piston 200 is moved to the bottom dead center and strikes the rod 300, the piston 200 is returned back to the initial position shown in FIG. 1A, and breaking of ground by the piston 200 in the short-stroke mode can be repeated by repeating this process described above.

In other words, the hydraulic striking device 10 according to an embodiment of the present invention performs a short-stroke mode by repeating the process shown in FIGS. 1A to 4.

Breaking Ground in Long-Stroke Mode

A case when the hydraulic striking device 10 according to an embodiment of the present invention breaks ground generally composed of hard rocks in a long-stroke mode is described in detail hereafter.

Breaking of ground in a long-stroke mode by the hydraulic striking device 10 according to an embodiment of the present invention is performed in order of FIGS. 1A, 2, 3A, 5, 6, 7A, and 8.

The long-stroke mode of the hydraulic striking device 10 starts from the status of FIG. 4 in the short-stroke mode. Accordingly, the operation including moving-up of the piston 200 shown in FIGS. 1 to 4 is the same as in the short-stroke mode described above, so it is not described herein.

After the hydraulic striking device 10 goes through the status of FIG. 4 showing the short-stroke mode, when the piston 200 is fully moved down to the bottom dead center, the bottom of the piston 200 strikes the top of the rod 300. Accordingly, the struck rod 300 moves down and strikes a hard rock in the ground, so the hard rock is broken.

When the rod 300 breaks the hard rock, a reacting force is transmitted to the piston 200. In this case, since a hard rock has a high strength, the reacting force transmitted to the piston 200 is very large, so the pressure of the working fluid in the upper chamber 113 is instantaneously increased at a high level.

Accordingly, the pressure of the working fluid in the second actuating line 722 connected to the upper chamber 113 is enough to push up the second spool 610 of the rock strength sensing valve 600, so the working fluid flowing in the second actuating line 722 presses the second spool pressing surface 611 of the second spool 610.

Therefore, as shown in FIG. 5, the second spool 610 is moved up to an up-position.

When the second spool 610 is positioned at the up-position, the second supply line 712 and the fourth supply line 714 are connected, so the working fluid supplied from the inlet port 700 is supplied to the piston control valve 400 through the second supply line 712 and the fourth supply line 714.

In this case, since the slider 430 of the piston control valve 400 is positioned at the down-position, the fourth supply line 714 and the third actuating line 723 are connected through the first groove 431 of the slider 430 (see FIG. 1B).

Accordingly, the working fluid flowing in the fourth supply line 714 flows into the third actuating line 723 through the first groove 431 and presses the first spool lower pressing surface 511 of the first spool 510 of the stroke force control valve 500.

As the first spool lower pressing surface 511 is pressed, the first spool 510 is moved up to the up-position, as shown in FIG. 6.

Accordingly, as described above, the first short-stroke line 731 and the second short-stroke line 732 are disconnected by the first spool lower pressing portion 512, the first long-stroke line 741 and the second long-stroke line 742 are connected through the first spool upper bridge 515, and the third supply line 713 and the third actuating line 723 are connected.

In this case, the second spool 610 of the rock strength sensing valve 600 is positioned at the down-position.

This is because the working fluid that has flowed from the upper chamber 113 to the second actuating line 722 has been moved by the instantaneous pressure increase inside the upper chamber 113 and cannot press any more the second spool pressing surface 611. Accordingly, as shown in FIG. 6, the second spool 610 of the rock strength sensing valve 600 is moved down to the up-position.

As described above, the first short-stroke line 731 and the second short-stroke line 732 are disconnected, while the first long-stroke line 741 and the second long-stroke line 742 are connected, so the short-stroke mode is changed into the long-stroke mode of the hydraulic striking device 10.

Accordingly, when high-pressure working fluid is supplied to the lower chamber 111, as shown in FIG. 7A, the piston 200 moves up to the second top dead center.

This is because the first short-stroke line 731 and the second short-stroke line 732 are disconnected and the working fluid supplied to the lower chamber 111 flows to the position where the first long-stroke line 741 is formed.

As described above, while the piston 200 moves up to the second top dead center, the slider 430 of the piston control valve 400 moves up to an intermediate position, as shown in FIG. 7B.

This is because the working fluid supplied to the fourth supply line 714 pushes up the first groove 431 in the status of FIG. 6, whereby the slider 430 is slightly moved up.

Obviously, as described above, even though the slider 430 is positioned at the intermediate position, the first groove 431 connects the fourth supply line 714 and the third actuating line 723.

However, since the second spool 610 of the rock strength sensing valve 600 is positioned at the down-position, supply of working fluid through the fourth supply line 714 is stopped, so the first spool 510 of the stroke force control valve 500 is lightly moved down, as shown in FIG. 7A. Accordingly, the third supply line 713 and the third actuating line 723 are disconnected by the first spool lower pressing surface 511.

When the piston 200 moves up and reaches the second top dead center, the working fluid in the lower chamber 111 flows to the piston control valve 400 through the first long-stroke line 741, the second long-stroke line 742, and the first actuating line 721.

Accordingly, the working fluid flowing to the first actuating line 721 pushes the third groove 433, so the slider 430 moves up to the up-position.

Accordingly, the piston control valve chamber 420 and the upper chamber 113 are connected and high-pressure working fluid is supplied to the upper chamber 113, so, as shown in FIG. 5, the piston 200 moves down to the bottom dead center and can strike the rod 300.

As described above, when the piston 200 moves down to the bottom dead center and strikes the top of the rod 300 with its bottom, reacting force is applied to the piston 200 and breaking by the hydraulic striking device 10 in the long-stroke mode can be repeated by repeating this process described above.

In other words, the hydraulic striking device 10 according to an embodiment of the present invention performs the long-stroke mode by sequentially going through the statuses of FIGS. 1A, 4, and 5 to 8, and then sequentially repeating the process of FIGS. 5 to 8.

Unlike hydraulic striking devices of the related art, in the hydraulic striking device 10 according to an embodiment of the present invention, the stroke modes are automatically switched in accordance with the statuses of rocks, so it is possible to efficiently break the ground.

When the rock strength sensing valve 600 is operated and operates the stroke force control valve 500 and the slider 430 is positioned at the intermediate position, the first groove 431 connects the fourth supply line 714 and the third actuating line 723. Further, when the slider 430 is positioned at the up-position, the first groove 431 disconnects the fourth supply line 714 and the third actuating line 723, so the stroke mode can be easily switched from the short-stroke mode into the long-stroke mode.

In detail, when the rock strength sensing valve 600 is operated, that is, when the second spool 610 is positioned at the up-position, high-pressure working fluid is supplied to the piston control valve 400 through the fourth supply line 714.

In this case, the high-pressure working fluid is supplied with the slider 430 positioned at the down-position, flows through the third actuating line 723 connected to the first groove 432, and presses the first spool 510, thereby operating the stroke force control valve 500.

As the first spool 510 is pressed and moved up to the up-position, the third supply line 713 and the third actuating line 723 are connected and the second spool 610 is moved down to the down-position. Accordingly, the high-pressure working fluid is kept in the fourth supply line 714, the first groove 431, the third actuating line 723, the third supply line 713, the second supply line 712, the first supply line 711, and the piston control valve chamber 420.

In other words, the fourth supply line 714 etc. momentarily make a closed circuit, so the working fluid pushes the first groove 431, whereby the slider 430 moves up to the intermediate position.

As the slider 430 moves up to the intermediate position, the first groove 432 disconnects the fourth supply line 714 and the third actuating line 723, so the first spool 510 moves down again.

Further, in this case, the working fluid supplied through the first long-stroke line 741 and the second long-stroke line 742 is supplied to the third groove 433 through the first actuating line 721 and fully moves up the slider 430 of the piston control valve 400, so working fluid is supplied to the upper chamber 113.

As described above, switching from the short-stroke mode into the long-stroke mode is made in accordance with the position of the second spool 610 of the rock strength sensing valve 600, the position of the slider 430 of the piston control valve 400, and the position of the first spool 510 of the stroke force control valve 500.

In other words, when the rock strength sensing valve 600 is operated (that is, the second spool 610 is moved up), the stroke force control valve 500 is operated, the first and second long-stroke lines 741 and 742 are connected by the operation of the stroke force control valve 500 (that is, the moving-up of the first spool 510), and the slider 430 of the piston control valve 400 is moved up to the intermediate position, and accordingly, the operation of the stroke force control valve 500 is stopped (that is, the first spool 510 is moved down). Further, the piston 200 reaches the second top dead center, working fluid is supplied through the first and second long-stroke lines 741 and 742, so the slider 430 is fully moved up and the piston 200 is moved down.

Accordingly, organic interaction of the piston control valve 400, the stroke force control valve 500, and the rock strength sensing valve 600 is important for changing into the long-stroke mode, and connection between the fourth supply line 714 and the third actuating line 723 according to the position of the slider 430 makes the organic interaction easy.

Further, when the first spool 510 of the stroke force control valve 500 moves up to the up-position, the third supply line 713 and the third actuating line 723 are connected, so working fluid easily moves up the slider 430 to the intermediate position and contributes to maintaining the first spool 510 at the up-position for a sufficient time. Accordingly, it becomes easier to change into the long-stroke mode.

Continuous Behavior of Hydraulic Striking Device (10)

The hydraulic striking device 10 according to an embodiment of the present invention may have a stroke mode between the short-stroke mode and the long-stroke mode.

For example, when the reacting force that is transmitted to the piston 200 is not strong enough to move the second spool 610 of the rock strength sensing valve 600 up to the up-position, a smaller amount of working fluid than the previous case flows through the fourth supply line 714 and the third actuating line 723. Since a relatively small amount of working fluid flows, the first spool 510 of the stroke force control valve 500 is moved up only for a short time.

Accordingly, when the piston 200 moves up to a predetermined position between the first top dead center and the second top dead center, the working fluid flows into the piston control valve 400 through the first and second short-stroke lines 731 and 732 and the first actuating line 721 and moves up the slider 430, thereby connecting the piston control valve chamber 420 and the upper chamber 113.

As the piston control valve chamber 420 and the upper chamber 113 are connected, high-pressure working fluid is supplied to the upper chamber 113 and the piston 200 moves down to the bottom dead center and strikes the rod 300.

As described above, depending on the time that the first spool 510 of the stroke force control valve 500 takes to move up, the piston 200 may have a top dead center that is higher than the first top dead center, but lower than the second top dead center.

In other words, when the reacting force that is transmitted to the piston 200 is strong enough only to move up the second spool 610 of the rock strength sensing valve 600, depending on the status of a rock, a top dead center of the piston 200 may be positioned between the first top dead center for the short-stroke mode (the status of FIG. 2) and the second top dead center for the long-stroke mode (the status of FIG. 7A).

Accordingly, the top dead center of the piston 200 may be positioned in the range between the status of FIG. 2 and the status of FIG. 7A, so striking by the hydraulic striking device 10 may be continuously made, that is, not step by step, depending on the status of a rock.

When the hydraulic striking device 10 according to an embodiment of the present invention breaks rocks through the continuous behavior, even if the statues of rocks continuously change, the top dead center of the piston 200 can be automatically changed to corresponding to the statuses.

Accordingly, it is possible to immediately change the modes among the short-stroke mode, the long-stroke mode, and a stroke mode between the short-stroke mode and the long-stroke mode (modes that satisfy the condition of first top dead center<top dead center<second top dead center), depending on the strength of rocks, so the hydraulic striking device 10 can more efficiently break rocks.

Operation of Hydraulic Striking Device (10) According to Second Installation Posture of First Spool (510) of Stroke Force Control Valve (500)

Operation of the hydraulic striking device 10 when the first spool 510 of the stroke force control valve 500 is in the second installation posture is described hereafter.

As described above, the first spool 510 may be installed in the first installation posture and the second installation posture, and the case when the first spool 510 is installed in the second installation posture is shown in FIG. 9.

As shown in FIG. 9, when the first spool 510 is installed in the second installation posture, the first spool upper pressing surface 516 faces the third actuating line 723 and the first spool lower pressing surface 511 is in contact with the first spring 520, in the stroke force control valve 500.

Accordingly, when the hydraulic striking device 10 breaks ground generally composed of weak rocks without the rock strength sensing valve 600 operated and with the first spool 510 positioned at the down-position, the first short-stroke line 731 and the second short-stroke line 732 are disconnected by the first spool upper blocking portion 513, and the first long-stroke line 741 and the second long-stroke line 742 are connected through the first spool upper bridge 515.

Further, even though the hydraulic striking device 10 breaks ground generally composed of hard rocks with the rock strength sensing valve 600 operated and with the first spool 510 positioned at the up-position, the first short-stroke line 731 and the second short-stroke line 732 are disconnected by the first spool upper blocking portion 513, and the first long-stroke line 741 and the second long-stroke line 742 are connected through the first spool upper bridge 515.

As described above, the reason that only the first and second long-stroke lines 741 and 742 are connected even though the first spool 510 is positioned at the up-position is because the first spool lower pressing surface 511 has a larger cross-sectional area than the first spool upper pressing surface 516.

In detail, since the first spool lower pressing surface 511 has a larger cross-sectional area than the first spool upper pressing surface 516, even if the working fluid supplied through the third actuating line 723 presses the first spool upper pressing surface 516, the first spool 510 is not moved up high.

Accordingly, even if the first spool 510 is positioned at the up-position, the first long-stroke line 741 and the second long-stroke line 742 keep connected through the first spool upper bridge 515, and the first short-stroke line 731 and the second short-stroke line 732 keep disconnected by the first spool upper blocking portion 513.

As described above, when the first spool 510 is installed in the second installation posture in the stroke force control valve 500, the first long-stroke line 741 and the second long-stroke line 742 are connected regardless of whether the rock strength sensing valve 600 is operated, so the hydraulic striking device 10 is maintained in the long-stroke mode. Accordingly, the piston 200 moves up to the second top dead center regardless of the strength of rocks in the ground.

As described above, it is possible to selectively switch the short-stroke mode and the long-stroke mode or maintain only the long-stroke mode of the hydraulic striking device 10 according to an embodiment of the present invention, depending on in which one of the first installation posture and the second installation position the first spool 510 of the stroke force control valve 500 is installed.

In other words, in an area of ground having weak rocks and hard rocks, it is possible to automatically switch between the short-stroke mode and the long-stroke mode, depending on the statuses of rocks in the ground, by installing the first spool 510 in the first installation posture, whereby it is possible to efficiently break the ground.

Further, in an area of ground generally having hard rocks, it is possible to maintain the long-stroke mode and quickly break the ground by installing the first spool 510 in the second installation posture.

As described above, a user of the hydraulic striking device 10 can increase work efficiency by simply changing the installation postures of the first spool 510 in accordance with the characteristics of the ground to break.

Further, as described above, since the cover 530 that covers the space where the first spring 520 and the first spool 510 are installed is detachable, it is possible to easily change the first spool 510 in the first installation posture or the second installation posture.

Although the present invention was described with reference to an embodiment, the present invention may be changed and modified in various ways by those skilled in the art without departing from the spirit and scope of the present invention described in the following claims.

(Description of Reference numerals)

| | |
|---|---|
| 10: Hydraulic striking device | |
| 100: Cylinder | 110: Hole |
| 111: Lower chamber | 112: Intermediate chamber |
| 113: Upper chamber | 114: Gas chamber |
| 120: Accumulator | 200: Piston |
| 210: Lower step | 220: Upper step |
| 300: Rod | |
| 400: Piston control valve | 410: Body |
| 411: Insertion chamber | 420: Piston control valve chamber |
| 430: Slider | 431: First groove |
| 432: Second groove | 433: Third groove |
| 434: Insertion | |
| 500: Stroke force control valve | 510: First spool |
| 511: First spool lower pressing surface | 512: First spool lower blocking portion |
| 513: First spool upper blocking portion | 514: First spool lower bridge |
| 515: First spool upper bridge | 516: First spool upper pressing surface |
| 520: First spring | 530: Cover |
| 600: Rock strength sensing valve | 610: Second spool |
| 611: Second spool pressing surface | 612: Second spool blocking portion |
| 613: Second spool bridge | |
| 700: Inlet port | 711: First supply line |
| 712: Second supply line | 713: Third supply line |
| 714: Fourth supply line | 721: First actuating line |
| 722: Second actuating line | 723: Third actuating line |
| 731: First short-stroke line | 732: Second short-stroke line |
| 741: First long-stroke line | 742: Second long-stroke line |
| 800: Outlet port | 810: Main discharge line |
| 811: First discharge line | 811a: 1-1 discharge line |
| 811b: 1-2 discharge line | 811c: 1-3 discharge line |
| 812; Second discharge line | 813: Third discharge line |

The invention claimed is:

1. A hydraulic striking device that has a piston disposed in a cylinder to move up and down, an upper chamber formed at an upper portion between the piston and the cylinder, and a lower chamber formed at a lower portion between the piston and the cylinder, the hydraulic striking device comprising:
a piston control valve controlling the piston moving up and down;
a stroke force control valve controlling the piston control valve;
a rock strength sensing valve controlling the stroke force control valve;
a fourth supply line connecting the rock strength sensing valve and the piston control valve to each other; and
a third actuating line connecting the stroke force control valve and the piston control valve to each other,
wherein the piston control valve has:
a body;
a piston control valve chamber formed in the body;
a slider moving up and down between the body and the piston control valve chamber; and
a first groove formed at the slider,
when the slider is positioned at a first down-position, the fourth supply line and the third actuating line are connected through the first groove, and when the slider is positioned at a first up-position, the fourth supply line and the third actuating line are disconnected, and
when the rock strength sensing valve is operated and the fourth supply line and the third actuating line are connected to each other, working fluid is supplied through the fourth supply line and the third actuating line and operates the stroke force control valve.

2. The hydraulic striking device of claim 1, further comprising:
an intermediate chamber formed between the upper chamber and the lower chamber between the piston and the cylinder;
a third supply line connecting an inlet port through which working fluid flows inside and the stroke force control valve to each other;
a first short-stroke line connecting the intermediate chamber and the stroke force control valve to each other;
a second short-stroke line connecting the first short-stroke line and the piston control valve to each other;
a first long-stroke line connecting the intermediate chamber and the stroke force control valve to each other and jointed to the intermediate chamber higher than the first short-stroke line; and
a second long-stroke line connecting the first long-stroke line and the piston control valve,
wherein the stroke force control valve has a first spool operating the stroke force control valve, and
when the first spool is pressed and moved up, the first spool disconnects the first short-stroke line and the second short-stroke line from each other and connects the third supply line and the third actuating line to each other.

3. The hydraulic striking device of claim 1, further comprising:
an intermediate chamber formed between the upper chamber and the lower chamber between the piston and the cylinder;
a third supply line connecting an inlet port through which working fluid flows inside and the stroke force control valve to each other;
a first short-stroke line connecting the intermediate chamber and the stroke force control valve to each other;
a second short-stroke line connecting the first short-stroke line and the piston control valve to each other;
a first long-stroke line connecting the intermediate chamber and the stroke force control valve to each other and jointed to the intermediate chamber higher than the first short-stroke line; and
a second long-stroke line connecting the first long-stroke line and the piston control valve,
wherein the stroke force control valve has a first spool operating the stroke force control valve,
the first spool has:
a first spool lower pressing surface forming a bottom of the first spool;
a first spool lower blocking portion formed over the first spool lower pressing surface;
a first spool upper blocking portion formed over the first spool lower blocking portion;
a first spool upper pressing surface forming a top of the first spool;
a first spool lower bridge formed between the first spool lower pressing surface and the first spool lower blocking portion; and
a first spool upper bridge formed between the first spool lower blocking portion and the first spool upper blocking portion,
when the first spool is installed in the stroke force control valve such that the first spool lower pressing surface faces the third actuating line, the first spool is installed in a first installation posture,
when the first spool is installed in the first installation posture and positioned at a second down-position, the first short-stroke line and the second short-stroke line are connected through the first spool upper bridge, and the first long-stroke line and the second long-stroke line are disconnected by the first spool upper blocking portion, and
when the first spool is installed in the first installation posture, the first spool lower pressing surface is pressed by working fluid supplied through the third supply line, and the first spool is positioned in a second up-position; the first short-stroke line and the second short-stroke line are disconnected from each other by the first spool lower blocking portion, and the first long-stroke line and the second long-stroke line are connected to each other through the first spool upper bridge.

4. The hydraulic striking device of claim 3, wherein when the first spool is installed in the first installation posture and positioned at the second down-position, the third supply line and the third actuating line are disconnected from each other by the first spool lower pressing surface, and
when the first spool is installed in the first installation posture, the first spool lower pressing surface is pressed by working fluid supplied through the third supply line, and the first spool is positioned at the second up-position; the third supply line and the third actuating line are connected to each other.

5. The hydraulic striking device of claim 3, wherein when the first spool is installed in the stroke force control valve such that the first spool upper pressing surface faces the third actuating line, the first spool is positioned in a second installation posture,
when the first spool is installed in the second installation posture and positioned at the second down-position, the first short-stroke line and the second short-stroke line are disconnected from each other by the first spool upper blocking portion, and the first long-stroke line and the second long-stroke line are connected to each other by the first spool upper bridge, and when the first spool is installed in the second installation posture, the first spool upper pressing surface is pressed by working fluid supplied through the third supply line, and the first spool is positioned at the second up-position; the first short-stroke line and the second short-stroke line are disconnected from each other by the first spool upper blocking portion, and the first long-stroke line and the second long-stroke line are connected to each other by the first spool upper bridge.

6. The hydraulic striking device of claim 5, wherein the first spool lower pressing surface has a larger cross-sectional area than the first spool upper pressing surface.

* * * * *